United States Patent
Davidovich et al.

(10) Patent No.: US 12,488,118 B2
(45) Date of Patent: Dec. 2, 2025

(54) SECURITY CONTROL SYSTEM AND METHOD

(71) Applicant: C2A-SEC LTD., Jerusalem (IL)

(72) Inventors: Yitzhack Davidovich, Jerusalem (IL); David Mor Ofek, Nes Harim (IL); Ze'ev Shalev, Jerusalem (IL)

(73) Assignee: C2A-SEC, LTD., Jerusalem (IL)

( * ) Notice: Subject to any disclaimer, the term of this patent is extended or adjusted under 35 U.S.C. 154(b) by 0 days.

(21) Appl. No.: 18/887,044

(22) Filed: Sep. 17, 2024

(65) Prior Publication Data

US 2025/0005169 A1    Jan. 2, 2025

Related U.S. Application Data

(63) Continuation of application No. PCT/IL2024/050120, filed on Jan. 31, 2024.

(30) Foreign Application Priority Data

Jan. 31, 2023  (IL) .......................................... 300324

(51) Int. Cl.
G06F 21/57    (2013.01)

(52) U.S. Cl.
CPC ...... *G06F 21/577* (2013.01); *G06F 2221/033* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,530,104 B1* | 5/2009 | Thrower | H04L 63/1433 713/188 |
| 10,868,825 B1 | 12/2020 | Dominessy | |
| 12,223,062 B1* | 2/2025 | Havdala | G06F 21/577 |
| 2012/0224057 A1 | 9/2012 | Gill | |
| 2014/0359780 A1* | 12/2014 | Zandani | H04L 63/1433 726/25 |
| 2017/0346846 A1 | 11/2017 | Findlay | |

(Continued)

FOREIGN PATENT DOCUMENTS

| | | |
|---|---|---|
| CN | 114221779 A | 3/2022 |
| CN | 115484105 A | 12/2022 |

(Continued)

OTHER PUBLICATIONS

Ebert and Beck (2023) Artificial Intelligence for Cybersecurity. Accepted paper. IEEE Software 40(6): 27-34, doi: 10.1109/MS.2023.3305726. 7 pages.

*Primary Examiner* — Fatoumata Traore
(74) *Attorney, Agent, or Firm* — Webb and Co. Ltd.

(57) ABSTRACT

A security control method, constituted of: receiving risk analysis information comprising data regarding a plurality of threats, each of the plurality of threats associated with a respective asset; loading a control database comprising data regarding a plurality of security controls; for each of the plurality of threats, matching one or more of the plurality of security controls to one or more attack steps of one or more attack paths associated with the respective threat; for each of the plurality of threats, selecting at least a subset of the matched security controls; and for each of the plurality of threats, outputting information regarding the selected security controls.

16 Claims, 19 Drawing Sheets

(56) References Cited

U.S. PATENT DOCUMENTS

| | | |
|---|---|---|
| 2018/0330103 A1 | 11/2018 | Chari |
| 2018/0337939 A1 | 11/2018 | Agarwal |
| 2019/0114435 A1 | 4/2019 | Bhalla |
| 2019/0147161 A1 | 5/2019 | Agarwal |
| 2019/0243813 A1 | 8/2019 | Pourmohammad |
| 2020/0057851 A1 | 2/2020 | Agarwal |
| 2020/0177618 A1 | 6/2020 | Hassanzadeh |
| 2020/0216097 A1 | 7/2020 | Galula |
| 2020/0380138 A1 | 12/2020 | Agarwal |
| 2021/0110319 A1 | 4/2021 | Gupta |
| 2021/0216928 A1 | 7/2021 | O'Toole |
| 2021/0234882 A1* | 7/2021 | Lee ............... H04L 63/1441 |
| 2021/0294901 A1 | 9/2021 | Agarwwal |
| 2021/0336982 A1 | 10/2021 | Akella |
| 2022/0019674 A1* | 1/2022 | Frey ............... H04L 63/1458 |
| 2022/0019676 A1* | 1/2022 | Guo ................. G06F 21/577 |
| 2022/0035938 A1* | 2/2022 | Carmichael ........ H04L 63/20 |
| 2022/0067171 A1* | 3/2022 | Nakanishi ......... G06F 21/577 |
| 2022/0121739 A1 | 4/2022 | Kawauchi |
| 2022/0129560 A1 | 4/2022 | Bulut |
| 2022/0147659 A1 | 5/2022 | Singh |
| 2022/0366332 A1* | 11/2022 | Duessel ............ G06Q 10/0635 |
| 2022/0394053 A1 | 12/2022 | Sorani |
| 2023/0067128 A1* | 3/2023 | Engelberg ......... H04L 63/1433 |
| 2023/0208870 A1 | 6/2023 | Ramani |
| 2023/0367884 A1 | 11/2023 | Ogura |
| 2023/0370486 A1 | 11/2023 | Paquette |
| 2023/0370495 A1 | 11/2023 | Deepen |
| 2024/0039944 A1* | 2/2024 | Whitmore ......... H04L 63/1433 |

FOREIGN PATENT DOCUMENTS

| | | |
|---|---|---|
| KR | 20080072770 A | 8/2008 |
| WO | 2022015747 A1 | 1/2022 |
| WO | 2024166104 A1 | 8/2024 |

* cited by examiner

SECURITY CONTROL SYSTEM AND METHOD

CROSS-REFERENCE TO RELATED APPLICATIONS

The present application is a continuation of PCT application PCT/IL2024/050120, filed Jan. 31, 2024, which claims priority from Israeli patent application 300324, filed Jan. 31, 2023, the entire contents of which incorporated herein by reference.

TECHNICAL FIELD

The present disclosure relates substantially to the field of software and hardware testing, and in particular to a security control system and method.

BACKGROUND

In programming and software development and in hardware design and development, security experts perform threat analysis and risk assessment ("TARA") to the software and hardware high level components. In this process, security experts analyze the risk and impact of cyber-attacks on a given component and its functionality. This process usually starts with item definition, identifying the threats, attack trees which describing how attacker performs his attack, risks and suggest optional security controls to reduce the risk. Software and hardware are used as implementation for the functionality of the components.

SUMMARY

Accordingly, it is a principal object of the present invention to overcome at least some of the disadvantages of prior art systems and methods for security threat treatment. This is provided in one embodiment by a security threat treatment method, the method comprising receiving risk analysis information comprising data regarding a plurality of threats, each of the plurality of threats associated with a respective asset.

In some examples, the method comprises loading a control database comprising data regarding a plurality of security controls.

In some examples, the method comprises, for each of the plurality of threats, matching one or more of the plurality of security controls to one or more attack steps of one or more attack paths associated with the respective threat.

In some examples, the method comprises, for each of the plurality of threats, selecting at least a subset of the matched security controls.

In some examples, the method comprises, for each of the plurality of threats, outputting information regarding the selected security controls.

In some examples, the output information is based at least in part on expenditure data associated with the respective security controls, the expenditure data indicating a cost and/or effort required to implement the respective security control.

In some examples, the output information is based at least in part on feasibility data associated with the respective security controls, the feasibility data indicating a degree to which the respective security control will reduce a feasibility rating of a respective one of the plurality of attack steps when implemented.

Additional features and advantages of the invention will become apparent from the following drawings and description.

Unless otherwise defined, all technical and scientific terms used herein have the same meaning as commonly understood by one of ordinary skill in the art to which this invention pertains. In case of conflict, the patent specification, including definitions, governs. As used herein, the articles "a" and "an" mean "at least one" or "one or more" unless the context clearly dictates otherwise. As utilized herein, "and/or" means any one or more of the items in the list joined by "and/or". As an example, "x and/or y" means any element of the three-element set $\{(x), (y), (x, y)\}$. In other words, "x and/or y" means "x, y or both of x and y". As some examples, "x, y, and/or z" means any element of the seven-element set $\{(x), (y), (z), (x, y), (x, z), (y, z), (x, y, z)\}$.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, the term "about", when referring to a measurable value such as an amount, a temporal duration, and the like, is meant to encompass variations of +/−10%, more preferably +/−5%, even more preferably +/−1%, and still more preferably +/−0.1% from the specified value, as such variations are appropriate to perform the disclosed devices and/or methods.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how several forms of the invention may be embodied in practice. In the accompanying drawings.

DETAILED DESCRIPTION OF CERTAIN EXAMPLES

Figure 1A:
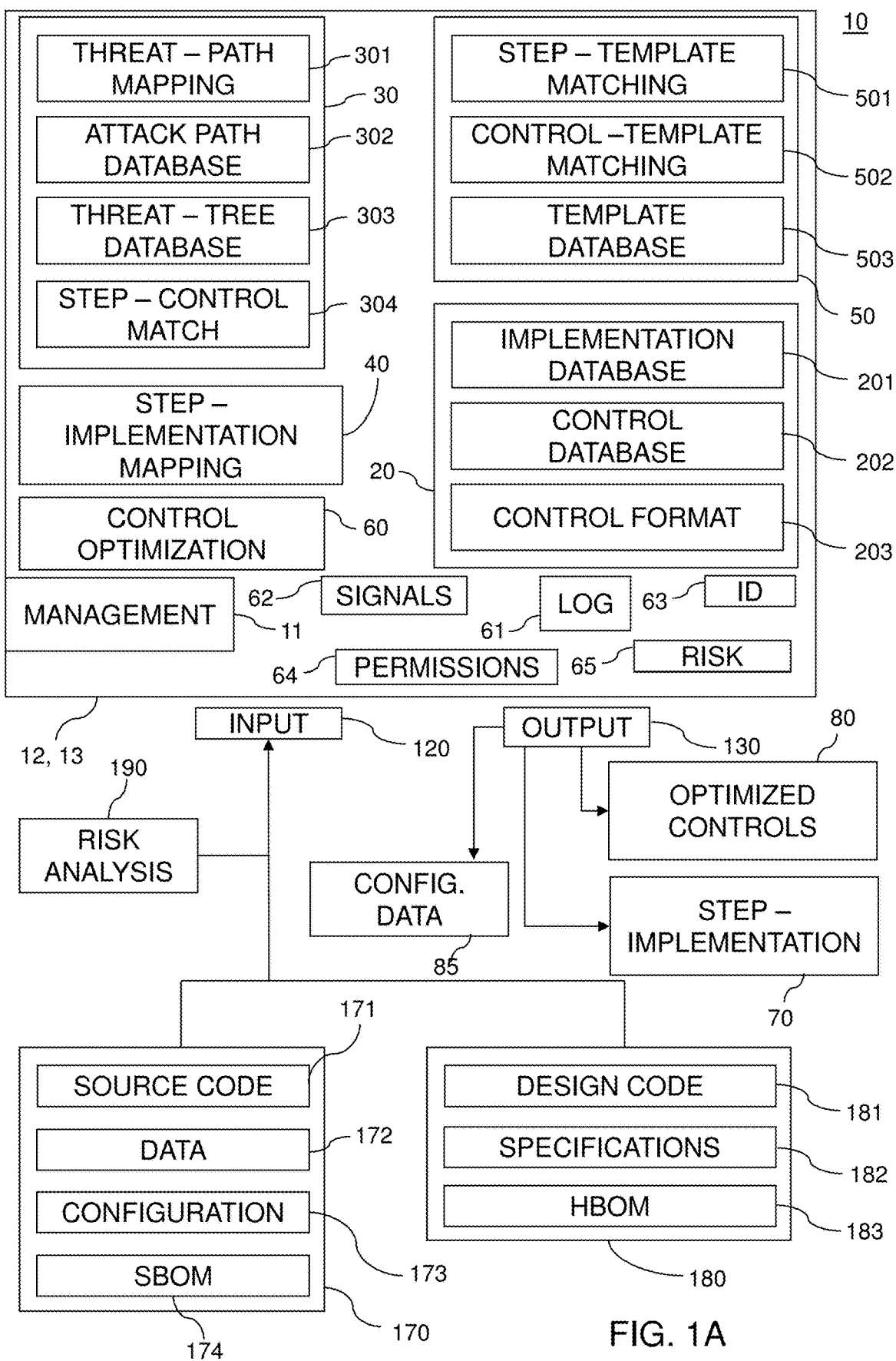
FIG. 1A-1D illustrate various portions of a system for security threat treatment, in accordance with some examples of the present disclosure.

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In the figures, like reference numerals refer to like parts throughout. In order to avoid undue clutter from having too many reference numbers and lead lines on a particular drawing, some components will be introduced via one or more drawings and not explicitly identified in every subsequent drawing that contains that component.

FIG. 1A illustrates a high-level block diagram of a security control system 10. In some examples, system 10 comprises: a management subsystem 11, optionally comprising a user interface and/or a command line interface; a security control repository 20; a control association subsystem 30; an attack step implementation mapping subsystem 40; a template matching subsystem 50; and a security control optimization subsystem 60.

In some examples, management subsystem 11, control association subsystem 30, attack step implementation mapping subsystem 40, template matching subsystem 50 and security control optimization subsystem 60 are each implemented on a dedicated processor, or set of processors, however this is not meant to be limiting in any way. In some examples, a processor 12, or set of processors 12, can be used to jointly run more than one of management subsystem 11, control association subsystem 30, attack step implementation mapping subsystem 40, template matching subsystem 50 and security control optimization subsystem 60.

In some examples, as will be described below, system 10 outputs: an attack step implementation mapping 70; and an optimized security control list 80. In some examples, system 10 comprises: an input subsystem 120; and an output subsystem 130 which can optionally output implementation mapping 70 and security control list 80. In some examples, as will be described below, attack step implementation mapping 70 comprises a list of attack steps, and how they are mapped to particular software and/or hardware implementations.

In some examples, management subsystem 11, control association subsystem 30, attack step implementation mapping subsystem 40, template matching subsystem 50 and security control optimization subsystem 60 are each implemented by a respective set of instructions stored on a memory 13, that when run by one or more processors 12 cause the respective processors 12 to perform the function of the respective one of management subsystem 11, control association subsystem 30, attack step implementation mapping subsystem 40, template matching subsystem 50 and security control optimization subsystem 60.

In some examples, system 10 further comprises a data logger configuration subsystem 61, as will be described below. In some examples, data logger configuration subsystem 61 is implemented by a respective set of instructions that when run by one or more processors cause the respective processors 12 to perform the function of the data logger configuration subsystem 61.

In some examples, system 10 further comprises a signal subsystem 62, as will be described below. In some examples, signal subsystem 62 is implemented by a respective set of instructions that when run by one or more processors 12 cause the respective processors 12 to perform the function of the signal subsystem 62.

In some examples, system 10 further comprises an identifier (ID) subsystem 63, as will be described below. In some examples, ID subsystem 63 is implemented by a respective set of instructions that when run by one or more processors 12 cause the respective processors 12 to perform the function of ID subsystem 63.

In some examples, system 10 further comprises a permissions subsystem 64, as will be described below. In some examples, permissions subsystem 64 is implemented by a respective set of instructions that when run by one or more processors 12 cause the respective processors 12 to perform the function of permissions subsystem 64.

In some examples, system 10 further comprises a risk subsystem 65, as will be described below. In some examples, risk subsystem 65 is implemented by a respective set of instructions that when run by one or more processors 12 cause the respective processors 12 to perform the function of risk subsystem 65.

In some examples, security control repository 20 comprises: a security control implementation database 201 comprising information regarding a plurality of security control implementations, as will be described below; a security control database 202 comprising information regarding a plurality of security controls, as will be described below; and a security control format table 203, as will be described below.

In some examples, control association subsystem 30 comprises: a respective plurality of instructions 301 for mapping threats to attack trees; an attack path database 302 comprising a plurality of attack trees; threat to attack path mapping database 303 comprising a plurality of maps for mapping threats to attack trees; and a plurality of instructions 304 for matching attack steps to security controls. Instructions 301, when run by one or more processors, cause the processors to map threats to attack trees, as will be described below. Instructions 304, when run by one or more processors, cause the processors to match attack steps to security controls, as will be described below.

In some examples, template matching subsystem 50 comprises: a plurality of instructions 501 for matching attack steps to templates; a plurality of instructions 502 for matching security controls to templates; and a template database 503 comprising a plurality of templates. Instructions 501, when run by one or more processors, cause the processors to match attack steps to templates, as will be described below. Instructions 502, when run by one or more processors, cause the processors to match security controls to templates, as will be described below.

In some examples, input subsystem 120 and output subsystem 130 each comprise a communication port. In some examples, input subsystem 120 and output subsystem 130 are each in communication with an external server and/or an external software program. Although input subsystem 120 and output subsystem 130 are illustrated herein as separate units, this is not meant to be limiting in any way, and a single hardware apparatus and/or software program can be utilized to implement input subsystem 120 and output subsystem 130.

In some examples, as illustrated in FIG. 1A, input subsystem 120 is in communication with an organization software repository 170, such as the Github software tool commercially available from Microsoft, Redmond, Washington, United States. In some examples, software repository 170 comprises: one or more software packages 171; data 172 that is used by the software packages 171; and a software configuration functionality 173 that configures the code of software packages 171 to use data 172. In some examples, organization software repository 170 further comprises Software Bill of Material files ("SBOM") 174. In some examples, SBOM files 174 are .spdx files. In some examples, SBOM files 174 comprise information regarding relevant software dependencies and a list of software libraries that are used by software packages 171.

In some examples, software configuration functionality 173 comprises files that describe network behavior, such as network communication description files (which can be in .arxml format) or a CAN DBC file (which is a text file that contains information for decoding raw CAN bus data to 'physical values').

In some examples, SBOM files 174 are stored in the organization Product Lifecycle Management tools, such as the JIRA software tool, commercially available from the Atlassian Corporation of Sydney, Australia.

In some examples, as illustrated in FIG. 1A, input subsystem 120 is in communication with an organization hardware repository 180, such as the Altium Designer software tool commercially available from Altium Ltd., Chatswood, New South Wales, Australia. In some examples, organization hardware repository 180 comprises: code 181 for implementing various hardware designs; a list of hardware specifications 182 associated with the hardware designs of code 181; and optionally a Hardware Bill of Material ("HBOM") list 183 associated with the hardware designs of code 181. HBOM list 183 is a list of the raw materials, sub-assemblies, intermediate assemblies, sub-components, parts, and the quantities of each required to manufacture an end product.

In some examples, as illustrated in FIG. 1A, system 10 receives risk analysis information 190 at input subsystem 120, as will be described below. An example for such a risk analysis information file can be an Excel document, commercially available from Microsoft Ltd., containing the risk analysis information. In some examples, risk analysis information 190 can be entered manually to system 10 using user interface subsystem 11. It is noted that the use of Excel as an input document is just an example and not limiting, since the same information can be stored in other data formats such as a "comma-separated values" (CSV) file or table of values from a database.

In some examples, risk analysis information 190 contains a description of the results of an analysis of the risk of predetermined security threats associated with one or more functionalities. In some examples, risk analysis information comprises Threat Analysis and Risk Assessment (TARA) information, such as defined in ISO/SAE 21434. Associating risk analysis information 190 with a functionality is just an example and not to be construed as limiting. In some examples, risk analysis information is associated with a software asset, signal asset or data asset; an item which is a container of at least one software asset, signal asset or data asset; a system which is a container of at least one item; and/or a system which is a container for at least one software asset, signal asset or data asset. In some examples, a collection of systems or items can be defined as a "Model".

The term "signal asset", as used herein, means a message being sent from a source to a destination.

The term "software asset", as used herein, means a feature that is implemented with software which performs at least one functionality. The term "functionality", as used herein, means any function that is performed, such as "send a signal", "raise alarm", "activate sensor", etc. In some examples, these functionalities are implemented in software by developers.

An example of a software asset is a "Software Update", which is a functionality that updates software, and is implemented by software in an item or a system. An example of a data asset is the data associated with an "Authentication key" which is used by the software asset to perform the functionality. An example of a system is an in-vehicle infotainment (IVI) system, which is a collection of hardware and software in automobiles that provides audio or video entertainment. An example of an item can be one of the hardware components of IVI system which runs at least on software.

Figure 1B:
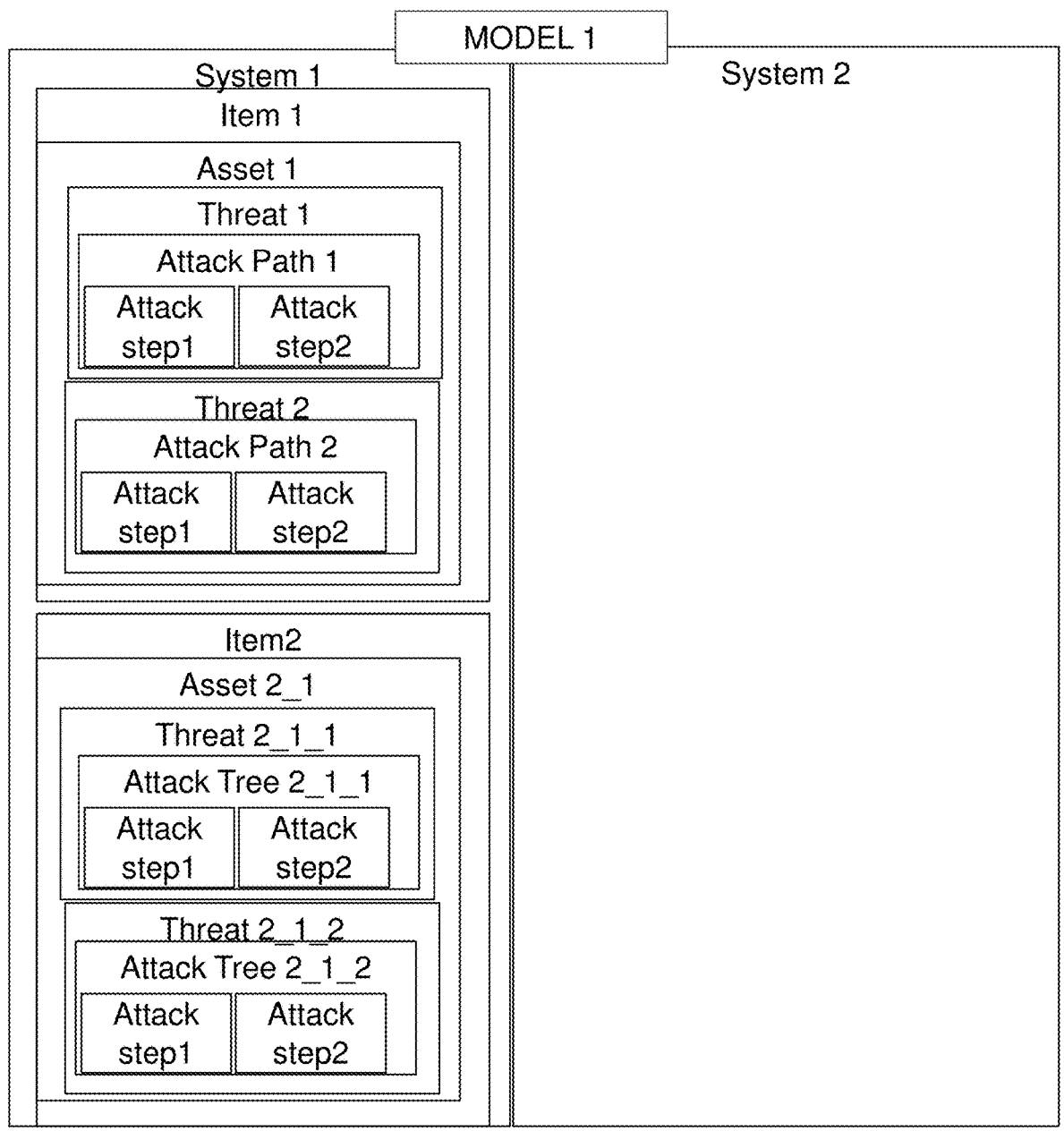

FIG. 1B illustrates an example of TARA information 190. As illustrated, a model is defined, the model denoted "Model 1". Model 1 describes at least one system which comprises at least one item comprising at least one asset. A non-limiting example for such a model is a car program of a specific vehicle containing a plurality of systems, one of the systems being the IVI system. The IVI system comprises items such as an application microcontroller and an in-vehicle communication Microcontroller. For example, "Item 1" illustrated in FIG. 1B may represent the application microcontroller and "Asset 1" may represents a software asset being run on the application microcontroller.

FIG. 1B illustrates a pair of systems, denoted System 1 and System 2 (System 2 not detailed for simplicity). Although a pair of systems are illustrated, this is not meant to be limiting in any way, and any number of systems can be included in risk analysis information 190.

In the example of FIG. 1B, System 1 comprises a pair of items, denoted Item 1 and Item 2. In the example of FIG. 1B, Item 1 has associated therewith an asset, denoted Asset 1, and Item 2 has associated therewith an asset, denoted Asset 2_1. Although Item 1 and Item 2 are each illustrated as having associated therewith a single asset, this is not meant to be limiting in any way, and each asset can have associated therewith any number of assets.

TARA information 190 of FIG. 1B also describes the threat that is associated with the asset. As described above, part of the Threat Analysis and Risk Assessment is to perform analysis and suggest different threats that can occur when the asset is compromised. In some examples, threats can be labeled by the STRIDE model, which is a model for identifying computer security threats developed by Praerit Garg and Loren Kohnfelder at Microsoft. The STRIDE model provides a mnemonic for security threats in six categories. In some examples, the threats of an asset can be labeled by the EVITA model of the Evita project, as known to those skilled in the art. In some examples, each threat contains a description of the method that can make the threat happen. Such a description is commonly defined by one or more attack paths which contains attack steps that are necessary to perform the attack that will lead to the threat, as will be described further below.

Asset 1 is associated with a pair of threats, denoted Threat 1 and Threat 2. Each of Threat 1 and Threat 2 has an associated attack tree, denoted herein Attack Tree 1 and Attack Tree 2, respectively. Although each threat is illustrated herein as having a single attack tree, this is not meant to be limiting in any way, and a plurality of attack trees can be provided for a single threat. Each of Attack Tree 1 and Attack Tree 2 is illustrated as comprising two attack steps, denoted Attack Step 1 and Attack Step 2, however this is not meant to be limiting in any way, and each attack tree can comprise any number of attack steps.

Similarly, Asset 2_1 is associated with a pair of threats, denoted Threat 2_1_1 and Threat 2_1_2. Each of Threat 2_1_1 and Threat 2_1_2 has an associated attack tree, denoted herein Attack Tree 2_1_1 and Attack Tree 2_1_2, respectively. Although each threat is illustrated herein as having a single attack tree, this is not meant to be limiting in any way, and a plurality of attack trees can be provided for a single threat. Each of Attack Tree 2_1_1 and Attack Tree 2_1_2 is illustrated as comprising two attack steps, denoted Attack Step 1 and Attack Step 2; however this is not meant to be limiting in any way, and each attack tree can comprise any number of attack steps.

Figure 1C:
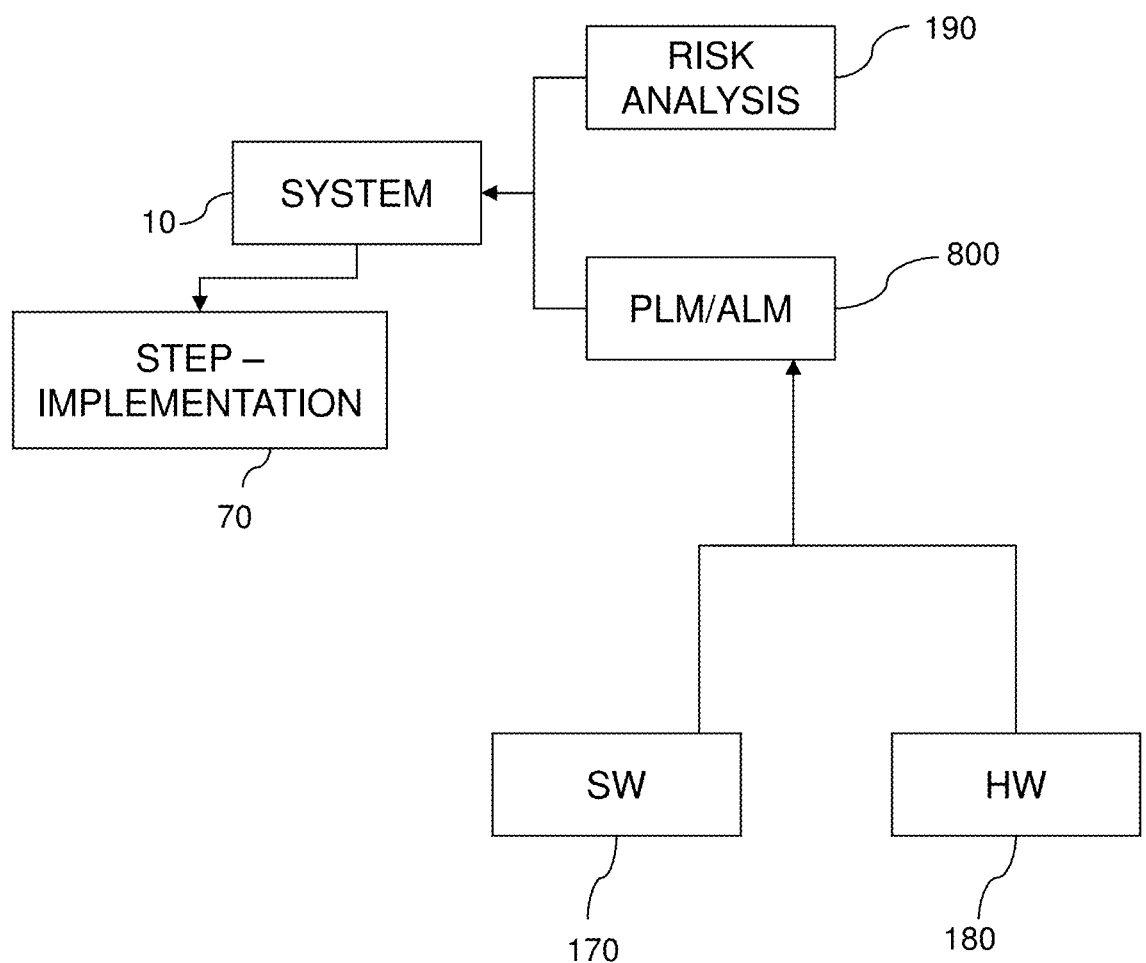
Figure 1D:
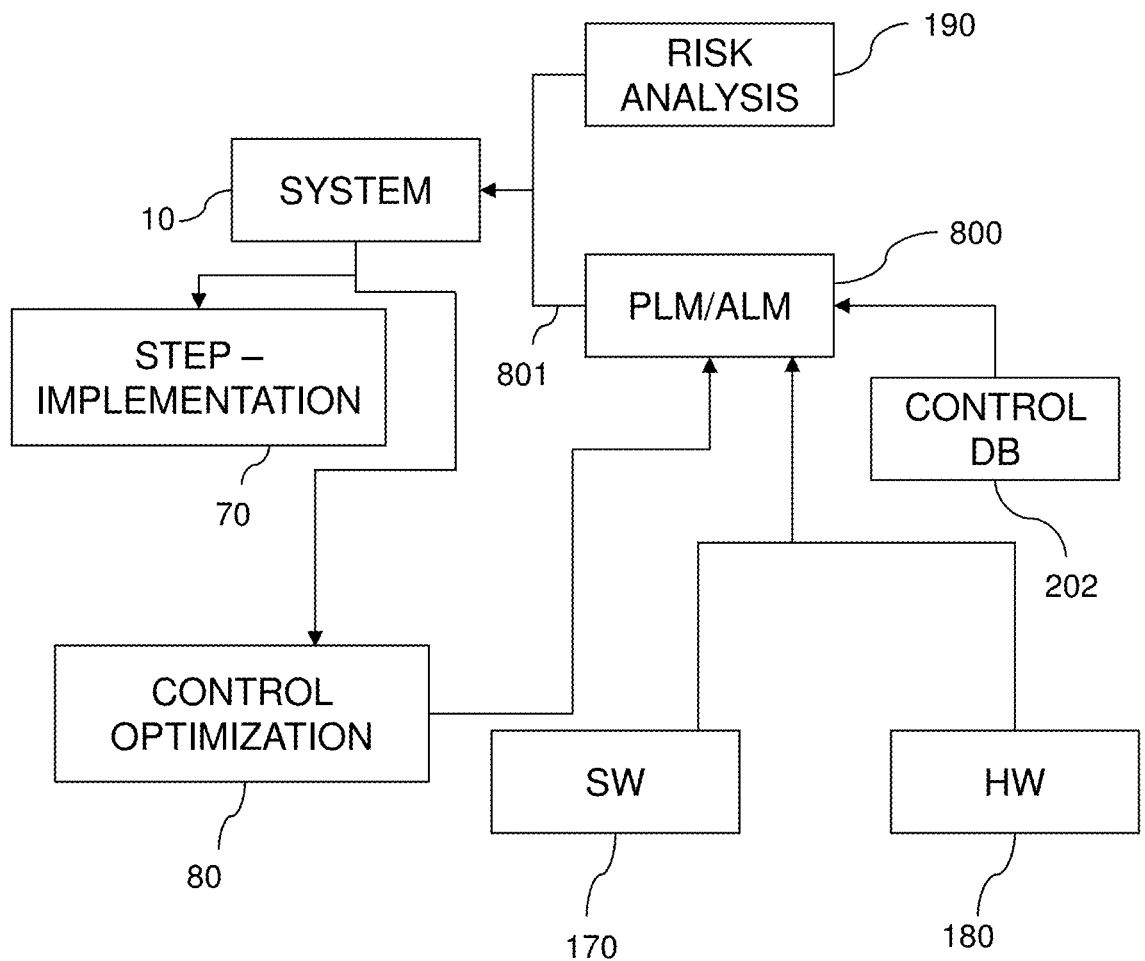

FIG. 1C illustrates a first configuration and method for the use of system 10 and FIG. 1D illustrates a second configuration and method for the use of system 10.

In some examples, as illustrated in FIG. 1C, system 10 is in communication with a Product Lifecycle Management (PLM) or an Application Lifecycle Management (ALM) system 800. PLM/ALM is the process of managing the entire lifecycle of a product/application from its inception through the engineering, design and manufacture stage. The Polarion® ALM system is an example of ALM system 800, and is commercially available from Polarion Software, a Siemens AG Company from Munich, Germany.

In some examples, PLM/ALM system 800 provides risk analysis information 190. Particularly, in some examples, risk analysis information 190 is received by PLM/ALM system 800 from an external source, and the received risk analysis information 190 is transmitted to input subsystem 120.

In some examples, PLM/ALM system 800 further provides additional information regarding the information stored in software repository 170 and/or hardware repository 180. Particularly, in some examples, information supplied by software repository 170 and/or hardware repository 180 are transmitted to input subsystem 120 by PLM/ALM system 800. In some examples, the information is output from PLM/ALM system 800 using the application programming interface (API) of PLM/ALM system 800, as known to those skilled in the art. This is common practice in software development process.

In some examples, as will be further described below, system 10 outputs an attack step implementation mapping 70. In some examples, as will be further described below, system 10 further outputs an optimized security control list 80.

In some examples, as illustrated in FIG. 1D, system 10 receives PLM/ALM information 801 from a PLM/ALM system 800. PLM/ALM information 801 may include, for example: software implementation task status (e.g., new, in-progress, complete); software implementation task effort; the software implementation task owner; and/or a reference ("link") to software implementation of the task. For example, an ALM system 800 may have list of functionalities that require implementation, and each functionality can be divided into "user-stories". In software development and product management, a user story is an informal, natural language description of features of a software. The task effort of implementing the feature can be described by story points which are a metric used in agile project management and development to estimate the difficulty of implementing a given user story, as known to those skilled in the art. In some examples, system 10 receives information regarding the task effort as user story points. In some examples, the task effort can be the time it takes to implement, the cost of the implementation and/or any other suitable metrics.

In some examples, as illustrated in FIG. 1D, system 10 receives risk analysis information 90 directly from input subsystem 120. Threat Analysis and Risk Assessment ("TARA") information 190 directly using the subsystem input 120. In some examples, a user can perform TARA work using the graphical user interface of management subsystem 11 of system 10.

In some examples, as illustrated in FIG. 1D, system 10 accesses an external security control database 202. In some examples, as illustrated in FIG. 1A, while in some examples, security control database 202 is part of subsystem 20 of system 10. In some examples, the output optimized security control list 80 is stored in system 10, but it also can be stored in PLM/ALM system 800, optionally using the application programming interface ("API") of PLM/ALM system 800. In some examples, PLM/ALM system 800 can present the information from the optimized security control list 80 for the development project. Similarly, in some examples, the output attack step implementation mapping 70 is stored in system 10, but it can also be stored in PLM/ALM system 800, optionally using the API of PLM/ALM system 800.

As described above, one of the steps in TARA is to define security threats to assets. For example, a software asset defined as a "signal router", which routes signals, can have a threat defined as "compromise the integrity of the signal router software". Another example for a threat associated with a signal router can be "spoofing the identity of the signal". It is noted that these examples are not meant to be limiting, and are described to help with understanding the term "threat" with regards to software assets and threat analysis.

There are different ways to describe how an attacker will be able to achieve the threat, for example by describing the attack path. For example, for the threat defined as "compromise the integrity of the signal router software", the attack path description can be "Using malicious software update, attacker will modify the software of the signal router".

Another way to describe how an attacker will be able to achieve the threat is by using an attack tree, or attack path. An attack path is defined herein as a plurality of sequential attack steps, where an attacker has to move through the sequential attach steps. An attack step is an action that an attacker has to perform as part of an attack. In some examples, each attack step comprises information of an associated subsystem, subcomponent or interface that the attack step is related to.

Attack trees are conceptual diagrams showing how an asset, or target, might be attacked. Attack trees are multi-leveled diagrams may consist of one root and a plurality of nodes. The nodes can include leaf nodes and non-leaf nodes. The root node is at the top of the tree and branches descend from the root. The root node represents the attacker's overall goal. The nodes at the lowest levels of the tree (leaf nodes) represent the activities performed by the attacker. Nodes between the leaf nodes and the root node depict intermediate states or attacker sub-goals. Each node is an attack step, as described above. Non-leaf nodes in an attack tree can be designated as either AND or OR nodes, and usually represented by the familiar Boolean Algebra AND/OR shapes. AND nodes represent processes or procedures. All of the activities or states represented by the nodes immediately beneath an AND node must be achieved to attain the goal or state represented by the AND node. OR nodes represent alternatives. If any of the nodes directly beneath an OR are attained then the OR state is also attained. In the attack tree, each path of the attack that satisfies the root is a respective attack path.

Figure 2A:
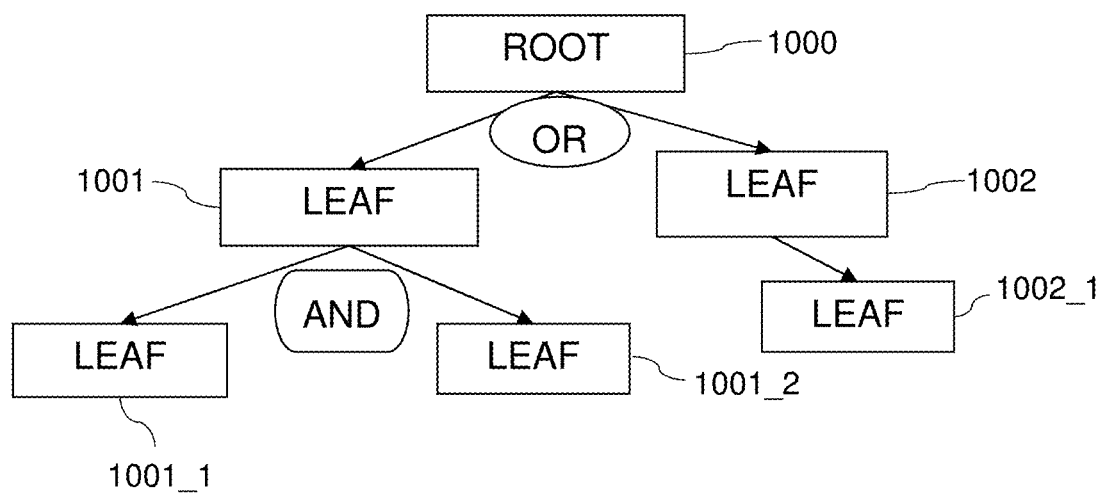
FIGS. 2A-2C illustrate various diagrams of attack trees, in accordance with some examples of the present disclosure.

FIG. 2A illustrates a diagram of an attack tree. The attack tree of FIG. 2A comprises: a root node 1000; a pair of nodes 1001 and 1002 branching from root; a pair of nodes 1001_1 and 1001_2 branching from node 1001; and a node 1002_1 branching from node 1002. It is noted that the particular configuration of the attack tree of FIG. 2A is illustrative only and any number of nodes can be provided in an attack tree.

In the example of FIG. 2A, the attack tree comprises an OR condition between nodes 1001 and 1002, which means that one attack path is sufficient to perform the attack. In contrast, the attack tree comprises an AND condition between nodes 1001_ and 1001_2, which means both nodes are needed in order to continue with the attack. Thus, the attack tree of FIG. 2A comprises two attack paths: a first attack path comprising nodes 1001, 1001_1 and 1002; and a second attack path comprising nodes 1002 and 1002_2.

Figure 2B:
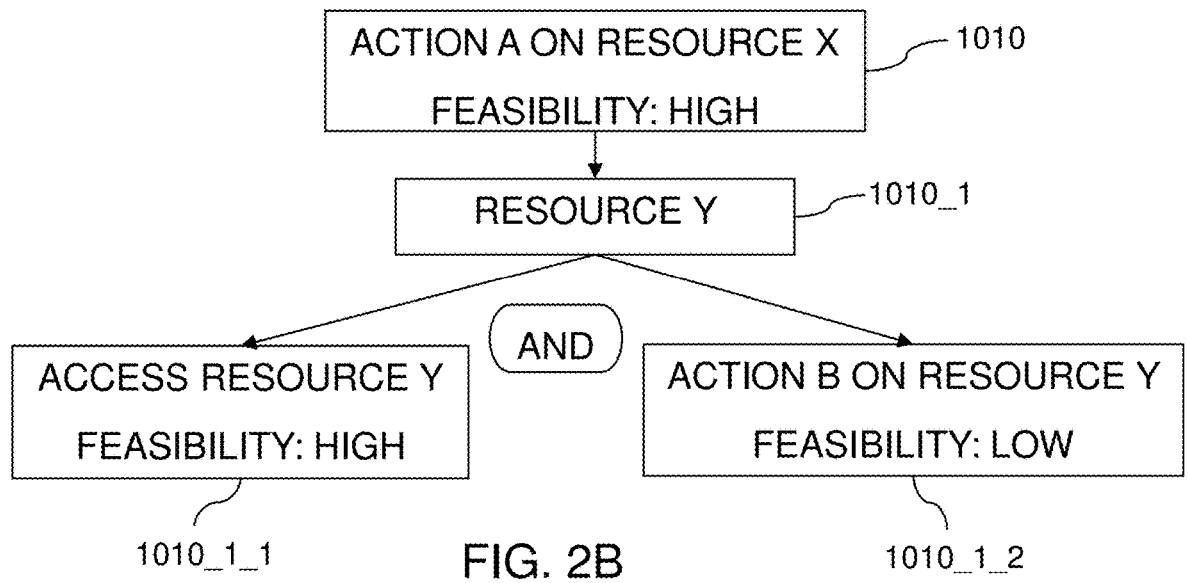

FIG. 2B illustrates an example of attack steps of an attack tree, in a human readable description. In some examples, an attack step can comprise an action that is performed on a resource. Particularly, FIG. 2B illustrates a first attack step 1010, which is to perform an action A on a resource X. Also illustrated is the feasibility rating of this attack step; in this case a high feasibility rating. The term "feasibility rating", as used herein, is a value that represents the chances of this attack actually happening in the real world, as known to those skilled in the art. The result of attack step 1010, in step 1010_1, is that resource Y can be accessed.

Attack step 1010_1_1 comprises accessing resource Y, with a high feasibility rating. Attack step 1010_1_2 comprises performing an action B on resource Y, with a low feasibility rating. In the example of FIG. 2B steps 1010_1_1 and 1010_1_2 comprise an AND condition therebetween, thus the combined attack step comprises getting resource Y and performing an action B on resource Y. An example for such a condition can be where resource Y is "kernel vulnerability", thus the attack step comprises two sub steps (1010_1_1 and 1010_1_2), which is finding the kernel vulnerability (sub step 1010_1_1) and exploiting the kernel vulnerability (1010_1_2). In other words, the term "resource", as used herein, means anything that is being used to perform the attack. The attack step might include information regarding the feasibility to perform this step, as known to whom skills in the art, the feasibility of performing the attack step can is based on different parameters such as: expertise that are needed to perform the step, resources that are needed to perform the attack step, time it takes to perform the attack steps and other parameters.

Table 1 describes examples of format types for attack steps, as follows:

TABLE 1

Attack Step format types

| Step structure | Format | Example |
| --- | --- | --- |
| Type 1 | Do Action | Do |
| Type 2 | By Subject | By application |
| Type 3 | Verb, subject | Send messages |
| Type 4 | Verb, subject | Send malicious message |
| Type 5 | Verb, subject, adjective | Send message with malicious content |
| Type 6 | Verb, subject, object | Exploit kernel vulnerability |

The syntax of the attack step can be described by one of the types that are in the table. For example, the attack step "Exploit Kernel Vulnerability" (described in FIG. 2B as sub steps 1010_1_1 and 1010_1_2) has a format of "Verb, Subject, Object", i.e., the verb is "exploit", the subject is "kernel" and the object is "vulnerability".

Figure 2C:
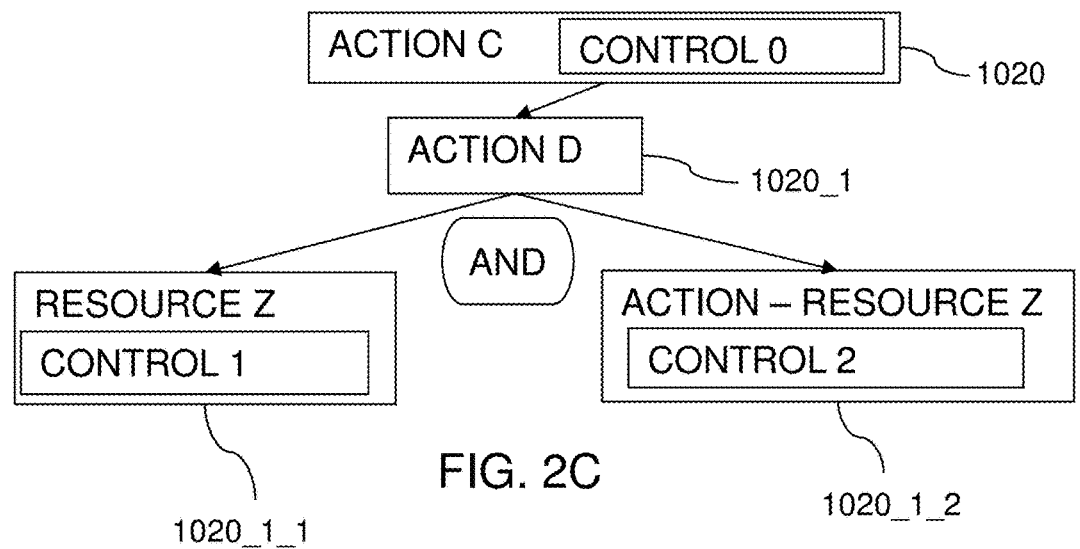

In some examples, the format of the attack steps includes more formats than described in table 1. In some examples, the attack step is defined using the simplest sentence possible. In some examples, utilizing management subsystem 11 of system 10, the user can define additional attack step formats. The use of attack step formats is further described below FIG. 2C illustrates an attack tree with attack steps and security controls. The term "security control", as used herein, means methods that are used to reduce the feasibility of the attack step. For example, in regards to an attack step defined as "Send malicious message", which may have a feasibility rating High, implementing a security control of "implement firewall to prevent unauthorized messages" reduces the feasibility of the attack step to Medium. Having security controls for the attack steps is not mandatory in the process of Threat Analysis and Risk Assessment (TARA), therefore system 10 matches security controls to each step, utilizing instructions 304 of control association subsystem 30, as will be described below.

In some examples, attack path database 302 comprises a plurality of attack trees, each with a respective plurality of attack steps. In the event that there is at least one security control stored in security control database 202 that can reduce the feasibility of an attack step, the respective security control is associated with the respective attack step. Therefore, the attack steps in attack path database 302 comprise security controls for each step that there is a possibility to reduce its feasibility.

In some examples, in the event that a new security control is identified that is currently not stored in security control database 202, the user can add the security control to security control database 202, optionally using management subsystem 11. In some examples, responsive to the security control being added to security control database 202, management subsystem 11 initiates a process for matching the added security control to relevant attack steps stored in attack path database 302, as will be described below.

In the example of FIG. 2C, a portion of an attack tree is shown, comprising 3 attack steps: a first step 1020; a second step 1020_1; and a third step comprising sub steps 1020_1_1 and 1020_1_2. As illustrated, attack step 1020 comprises performing an action C, and has associated therewith a security control 0. Attack step 1020_1 comprising performing an action D. Sub step 1020_1_1 comprises accessing a resource Z and has associated therewith a security control 1. Sub step 1020_1_2 comprises performing an action with resource Z and has associated therewith a security control 2. Although attack step 1020_1 does not have a security control associated therewith, the attack path will be mitigated, or remediated due to security controls 0, 1 and 2.

In some examples, management subsystem 11 is configured to output the attack tree, attack path and/or a list of attack steps, on a user display, such as the graphical user interface. In some examples, when outputting an attack step, the associated security control is output within the attack step, however this is not meant to be limiting in any way. In some examples, the associated security control can be output externally to the respective attack step. In some examples, the security controls can be output in a separate list. In some examples, each attack step having a security control associated therewith shows an indication that such a security control exists and the respective security control can be output responsive to a respective user input (e.g., pointing to a predetermined area of the output attack step).

Table 2 shows an example of a plurality of security controls stored in security control database 202, as follows:

TABLE 2

Security Controls

| ID | Name | Description | Template | Implementations | Feasibility |
|---|---|---|---|---|---|
| UUIID_1 | WP.1 | Messages sent on the bus shall be protected against modification | SA_1 | UUID_1, UUID_33 | Low Medium |
| UUIID_2 | WP.2 | Security controls should be applied to systems with remote access | [SA_1, SA_2] | UUID_2, UUID_22 | Medium Medium |
| UUIID_4 | WP.4 | Best security practice should be applied to design of system | None | UUID_4, UUID_44 | Medium Low |

As shown in the example of table 2, in some examples each security control has the following features: a respective ID value; a name; a description; one or more respective templates associated therewith (as will be described below); one or more respective implementations (as will be described below); and a feasibility update value, i.e., the new feasibility of an attack step in the event that this security control is used to reduce the feasibility of that attack step. It is noted that table 2 is not meant to be limiting, and the security controls stored in security control database 202 can comprise more, or less, features, without exceeding the scope of the disclosure.

In some examples, as shown in table 2, security control WP.1, described as "Messages sent on the bus shall be protected against modification", can be used to reduce the feasibility of an attack step that involves message modification. In some examples, as will be described below, each template comprises different metadata that can be used to describe the security control.

Particularly, in some examples, template database 503 comprises a plurality of templates. In the event that a new security control is input to system 10 (and optionally added to security control database 202, as described above), in some examples management subsystem 11 initiates a process (utilizing instructions 502) to match the added security control to respective one of the plurality of templates stored on template database 503, as will be further described below.

In some examples, as described above, security control implementation database 201 comprises information regarding a plurality of security control implementations. The term "security control implementation", as used herein, means a method to implement a respective security control. Some examples of security control implementations are shown in tables 3A and 3B, as follows (tables 3A and 3B are provided as separate for simplicity only):

TABLE 3A

Security Control Implementations

| ID | Parent_id | Type | Name | Description |
|---|---|---|---|---|
| UUIID_11 | UUIID_1 | Message protection | WP.1_impl_1 | Messages sent on the bus shall signed with key, stored in HSM, using elliptic curve . . . |
| UUID_12 | UUIID_1 | Message protection | WP.1_impl_2 | Messages sent on the bus shall signed with key, stored read only memory, using elliptic curve . . . |

TABLE 3B

Security Control Implementations

| ID | HW dependency | SW dependency | Cost (days) | System requirement | Feasibility |
|---|---|---|---|---|---|
| UUIID_11 | HSM | Crypto drivers | 10 | Boot time: 0 | Low |
| UUID_12 | RAM | Crypto drivers | 40 | Boot time: 200 msec | Medium |

In some cases, there can be a plurality of options to implement one security control. In some examples, the main differences between the implementation options are the resources that are needed to implement the security control, the effort/cost of the implementation and its real-world feasibility. For example, as illustrated in tables 3A and 3B, the implementation of security control "Messages sent on the bus shall be protected against modification", can be implemented implementation WP.1_impl_1 or implementation WP.1_impl_2. Each option requires different resources—WP.1_impl_1 requires the use of a Hardware Secure Storage ("HSM") to store a key, while WP.1_impl_2 doesn't require additional hardware, and only requires random access memory (RAM). As result, WP.1_impl_1 can reduce the feasibility of the respective attack step to Low while using WP.1_impl_2 will reduce the feasibility of the respective attack step to Medium.

Tables 3A and 3B show examples where security control implementation information comprises the following features: an ID; the ID of the associated security control; the type of the security control; a description of the implementation; the hardware dependency of the implementation; the software dependency of the implementation; the time cost, in days, of the implementation; and the feasibility update value, however this is not meant to be limiting in any way. In some examples, more, or less, features can be provided for each security control implementation without exceeding the scope of the disclosure. As shown above in table 2, in some examples each security control has associated therewith a respective feasibility update value. In some examples, this value is the feasibility update value of an implementation of the security control that has been selected by system 10. The selection of implementations will be further described below.

Different security control implementations with different dependencies allows implementing the security controls on different components with different resources. For example, in the event that the hardware component doesn't include an HSM, there is no way to implement WP.1_impl_1. In order to reduce the feasibility of the respective attack step it will be required to implement WP.1_impl_2, even if it is inferior from a security perspective In some examples, as will be described below, security control optimization subsystem 60 generates an optimized security control list 80. In some examples, while generating optimized security control list 80, security control optimization subsystem 60 considers the implementation dependencies. For example, in regards to a particular security control, in the event that an HBOM is associated with the respective item that the respective security control is associated with, security control optimizations subsystem 60 will filter out all security control implementation options that can't be implemented.

Matching Through Templates

Table 4 describes examples of formats of the descriptions of security controls, as follows:

TABLE 4

Security Control Format Types

| Control structure | Format | Example |
|---|---|---|
| Type 1 | Object[s], verb-positive, Subject | Security controls should be applied to systems |
| Type 2 | Object[s], verb-negative, Subject | Open source should not be used in systems |
| Type 3 | Object[s], verb-positive, Subject, Object | Security controls should be applied to systems with remote access |
| Type 4 | Object[s], verb-negative, Subject, Object | Open source should not be used in systems with remote access |
| Type 5 | Object[s], verb-positive, Subject, adjective | The vehicle shall verify the authenticity and integrity of messages it receives |
| Type 6 | Object[s], verb-negative, Subject, adjective | The vehicle should not use the unauthenticated messages it receives |
| Type 7 | Subject1, verb, object, [adjective1], [using] path, method | Attacker gains control of network using controller hack by escalating privileges |
| Type 8 | Subject1, verb, object, [adjective1], method, [of] path | Attacker gains control of network by escalating privileges of controller app |

Although table 4 shows 8 types of security control formats, this is not meant to be limiting in any way, and more, or less, formats can be provided without exceeding the scope of the disclosure. In some examples, the security control description preferably comprises as a simple sentence as possible. In some examples, utilizing management subsystem 11, the user can add additional security control formats. The usage of the security controls formats is described below.

Figure 3A:
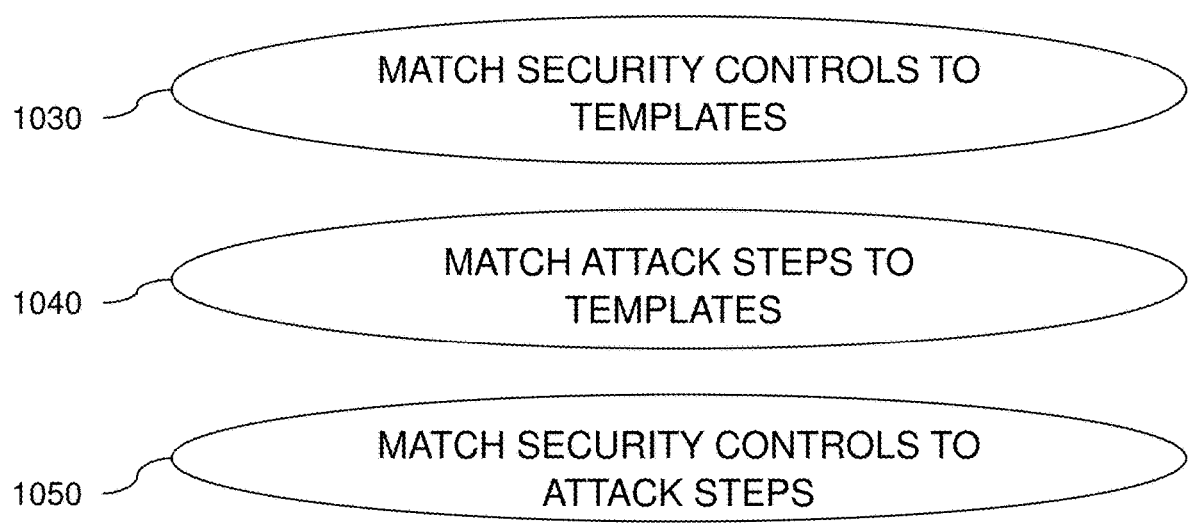
FIGS. 3A-3E illustrate various diagrams of a process for matching security controls to attack steps of attack paths, in accordance with some examples of the present disclosure.

FIG. 3A illustrates a general flow of a method for matching security controls to attack steps, utilizing template matching subsystem 50. It is noted that the method described herein is not meant to be limiting, and security controls can be matched to attack steps using other suitable methods, without exceeding the scope of the disclosure. In stage 1030, one or more security controls is matched to a respective template, as will be described below in relation to FIG. 3B. In stage 1040, one or more attack steps are matched to a respective template, as will be described below. In stage 1050, one or more security controls are match to one or more attack steps, as will be described below.

Figure 3B:
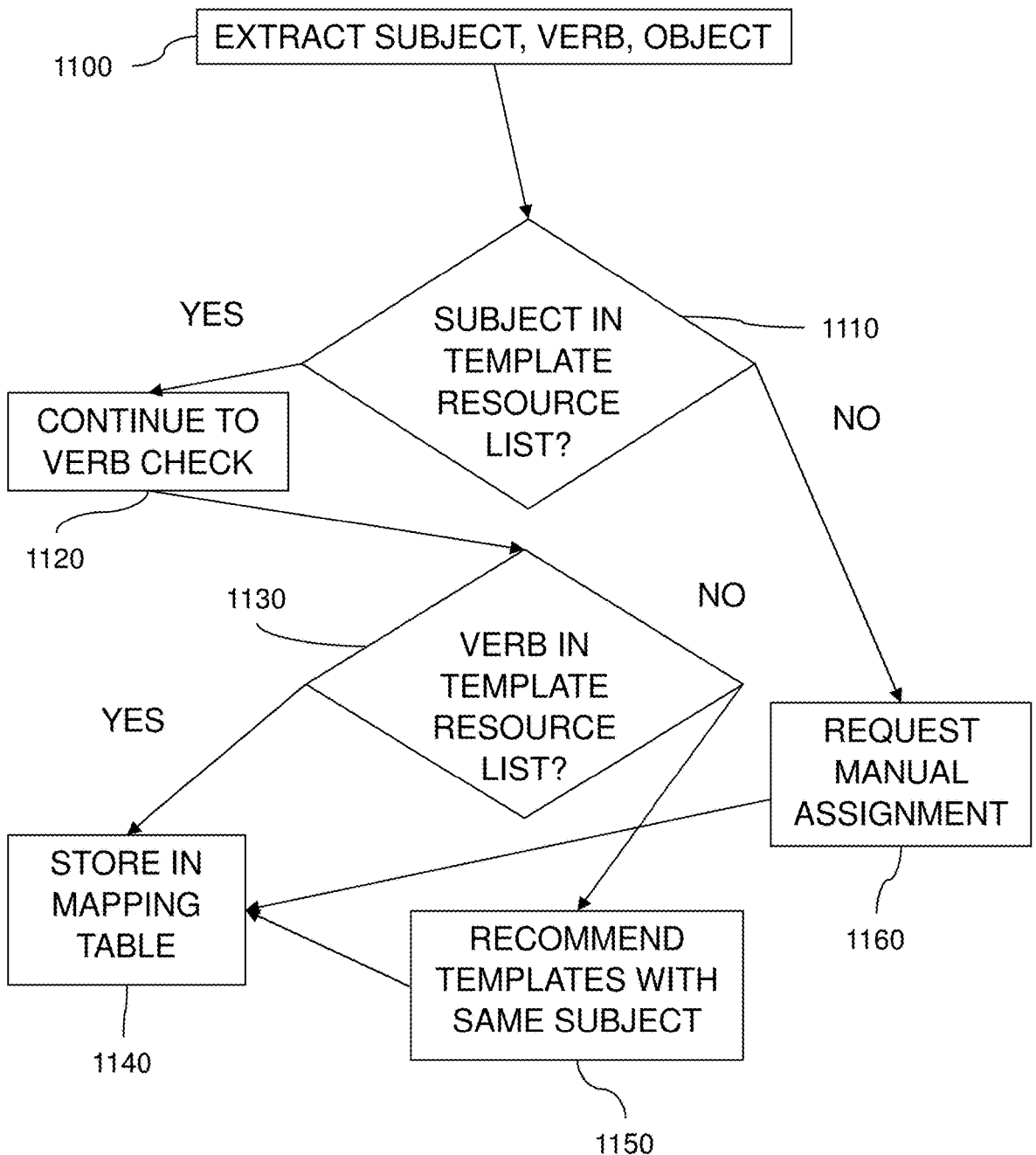

FIG. 3B illustrates an example process for matching security controls to templates stored on template database 503, utilizing instructions 502. It is noted that the process of FIG. 3B is not meant to be limiting, and instruction 502 may implement different processes for matching security controls to templates, without exceeding the scope of the disclosure. In some examples, iteratively, the security controls stored in security control database 202 are analyzed to identify security controls without associated templates. In some examples, the method of FIG. 3B is performed for each of these identified security controls. The security controls described in relation to FIG. 3B are similar to "WP.4" of table 2.

In stage 1100, for each security control the subject, verb and/or object are extracted from the description of the security control. Table 5 shows an example of different options of subjects and verbs, as follows:

TABLE 5

Security Control to Template Mapping

| ID | Description | Subjects | Verbs | Object | Template |
|---|---|---|---|---|---|
| SC1 | Messages sent on the bus shall be protected against modification | ['messages', 'bus', 'modification'] | ['send', 'protect'] | None | [T_1] |
| SC2 | Security controls should be applied to the kernel to prevent exploitation | ['security', 'controls', 'kernel', 'exploitation'] | ['applied', 'prevent'] | None | [T_2] |

In some examples, a process of text analysis is continuously trained using the information in security control repository 20, and the trained model is used for extracting the respective features from the description of the security controls. An example of a process to train such a model is described below in relation to FIGS. 3C-3D.

In some examples, the process of instructions 502 use text matching between a parsed sentence in a security control and the template. In some examples, text matching is performed using software-based techniques to compare two strings or algorithms for text similarity such as "tf-id"—a numerical statistic that is intended to reflect how important a word is to a document in a collection or corpus, as known to those skilled in the art. In stage 1110, the subject of the security control is compared to the subjects of the templates to determine whether there is a template containing such a subject.

Although the process of FIG. 3B is illustrated herein such that the subject is searched for before the verb, this is not meant to be limiting in any way, and the verb can be searched for before the subject without exceeding the scope of the disclosure. Although the process of FIG. 3B is illustrated herein such that the features of each security control are used to identify a respective template, this is not meant to be limiting in any way. In other examples, the respective feature of each template may be taken to identify a respective one of the plurality of security controls whose description comprises the respective feature.

In the event that in stage 1110 one or more templates are identified that comprise the subject of the respective security control, in stage 1120 the process proceeds to the verb extracted from the description of the security control. Particularly, in stage 1130 the verb of the security control is compared to the verbs of the templates, or template, identified in stage 1110 to determine whether there is a template containing such a verb.

In some examples, in the event that in stage 1130 a template is identified, in stage 1140 the security control is matched to the identified template, and the details of the mapping between the respective security control and the respective template are optionally stored in a respective table, such as table 5 described above. It is noted that the term "table" as used herein is not meant to be limiting to any particular format for storing and/or outputting data, and is merely used to describe a predetermined relationship between the stored data/information.

In some examples, in the event that in stage 1130 a template was not successfully identified, in stage 1150 management subsystem 11 outputs to the user a list of recommended templates. In some examples, responsive to a user input selecting one of the recommended templates, mapping details of the selected template are stored in security control repository 20 and in some examples are used to improve the trained model for future reuse. In some examples, the mapping details of the selected template are then stored in the respective table in stage 1140, as described above.

In some examples, in the event that in stage 1110, a template was not successfully identified, in stage 1160 management subsystem 11 prompts the user to manually assign a template to the respective security control. In some examples, responsive to a user input assigning a template to the security control, mapping details of the selected template are stored in security control repository 20 and in some examples are used to improve the trained model for future reuse. In some examples, the mapping details of the selected template are then stored in the respective table in stage 1140, as described above.

As described above, in some examples a model is trained for extracting the respective features from the description of the security controls. Such a model is also trained for extracting the respective features from the description of attack steps, as will be described below. In some examples, a normalization dictionary is prepared (optionally manually) for the descriptions of security controls. One example of a portion of such a dictionary is given in table 6, as follows:

TABLE 6

Attack Step—Data Normalization Dictionary

| Original | Type | Replacement |
|---|---|---|
| run time | general | runtime |
| dos attack | attack | attack of type dos |
| dos | attack | attack of type dos |
| launch | action | perform |
| retrieve | action | get |
| issue | action | perform |
| Inject | action | send |
| eavesdrop | action | listen |
| app | general | application |
| comm | general | communication |
| ivi | Automotive component | device |
| gw | Automotive component | device |

TABLE 6-continued

Attack Step—Data Normalization Dictionary

| Original | Type | Replacement |
|---|---|---|
| tcu | Automotive component | device |
| telematic control unit | Automotive component | device |
| gateway | Automotive component | device |
| bms | Automotive component | device |
| hu | Automotive component | device |
| wifi network | network | network of type wifi |
| wifi | network | network of type wifi |
| headunit | network | device |
| can network | network | network of type can |
| can | network | network of type can |

The example of table 6 is given for attack steps, however in some examples a similar dictionary is provided for the descriptions of security controls. In the example shown in table 6, a list of possible words from descriptions of attach steps are stored, along with the type of the word (i.e., what the word is referring to) and a replacement word to use for mapping to a template.

Figure 3C:
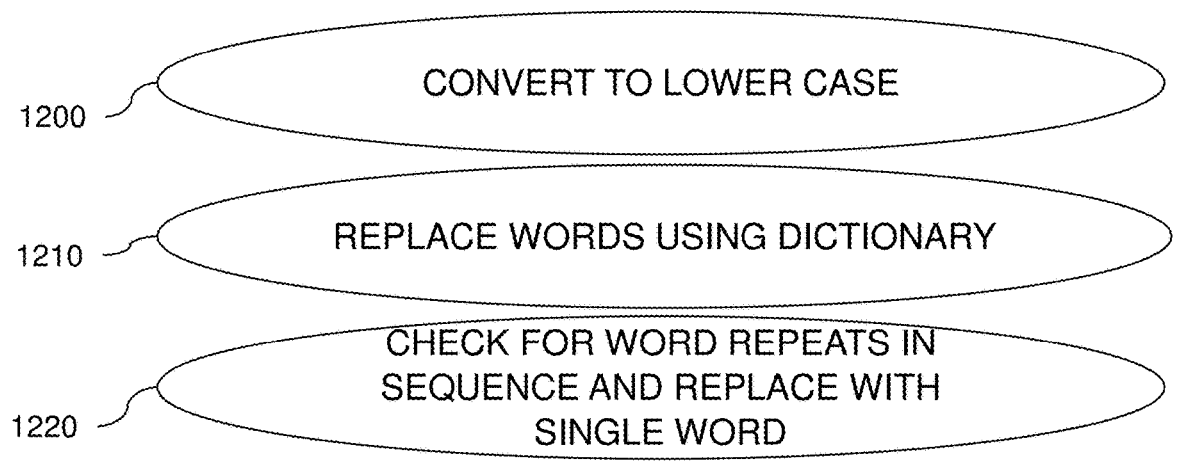

FIG. 3C illustrates a high-level flow of a process for normalizing the text of the description of the security controls, the process performed utilizing instructions 502. It is noted that the process of FIG. 3C can be similarly utilized for the text of the description of attack steps, as will be described below. In some examples, in stage 1200, the words of the description of the security control are converted to lower case. In some examples, in stage 1210, words are replaced using the stored dictionary, as described above in relation to table 6. In some examples, in stage 1220, repeating words in the description text are identified and replaced with a single word. For example (e.g., in regards to an attack step), if a sequence of words is as follows: "send message in network", then the sequence is replaced with the following sequence: "send message in network".

Figure 3D:
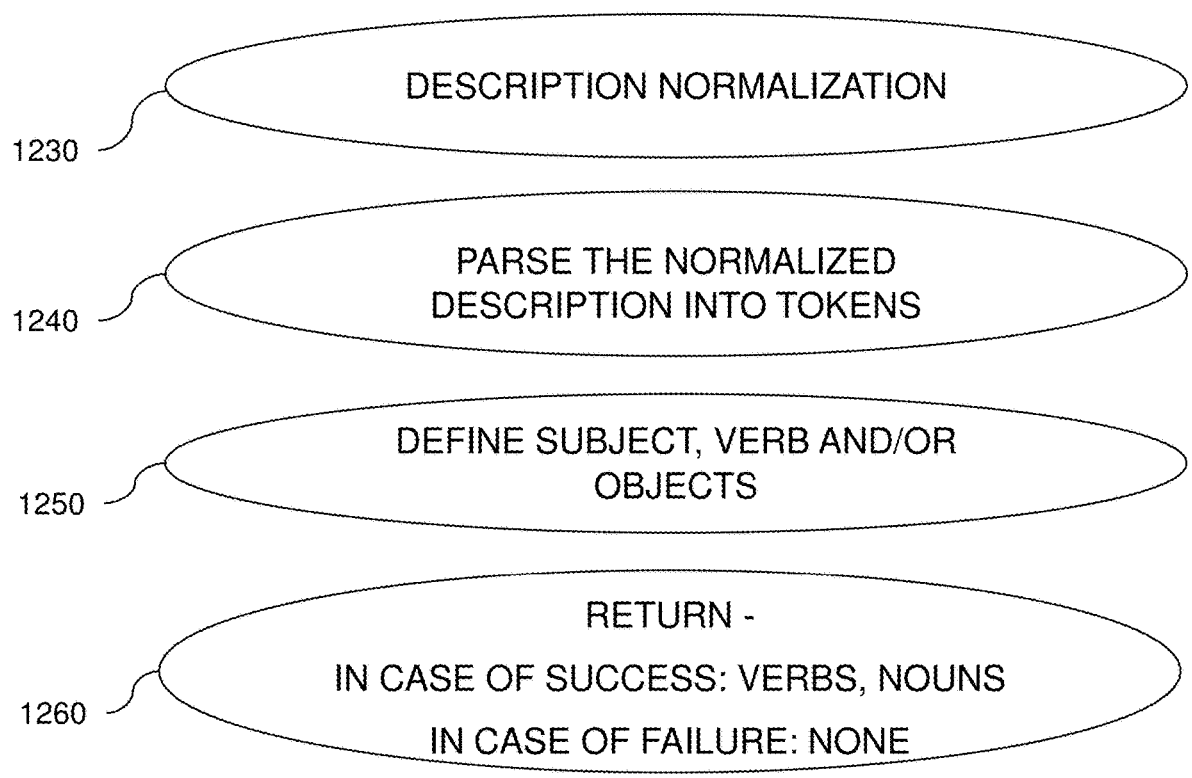

FIG. 3D illustrates a high-level flow of a process for training a model for extracting the respective features from the description of the security controls, the process performed utilizing instructions 502. It is noted that the process of FIG. 3D can be similarly utilized for the text of the description of attack steps, as will be described below.

In some examples, in stage 1230, the description of the security control (or attack step) is normalized, as described above in relation to stages 1200-1220. In some examples, in stage 1240, the normalized description of stage 1230 is parsed into tokens. In some examples, parsing is performed using the "Part of speech tagging" technique, optionally using the spaCy library, from spacy.io, or the Natural Language Tool Kit (NLTK), from nltk.org. An example for using spaCy coding language in Python for parsing is as follows:

```
import spacy
nlp = spacy.load("en_core_web_sm")
result = { }
attack_steps = read_attack_steps_from_repository( )
for step in attack_steps:
    normalized_step = cleanup(step)
    step_parts = nlp(normalized_step)
    subject,verbs,objects = post_process(step_parts)
```

```
if subject != None:
    result["step.id"] = {
    "verbs":verbs,
    "objects":nouns
    }
else:
    result["step.id"] = None
```

In stage 1250, post processing is performed to define a subject, verbs and/or objects found in the description. In some examples, plural nouns are converted to singular nouns. An example for Python code to implement such a step is as follows:

```
import inflect
def get_singular(plural_noun):
    p = inflect.engine( )
    plural = p.singular_noun(plural_noun)
    if (plural):
        return plural
    else:
        return plural_noun
```

In some examples, all, or some, forms of verbs are converted to a predetermined form, such as a present simple single form. In some examples, this can be performed by using the .lemma feature of the token from the spaCy library.

Returning to stage 1040 of FIG. 3A, as described above, one or more attack steps are matched to a respective template. In some examples, the process of stages 1100-1160 are performed, by utilizing instruction set 501, to match the attack steps to respective templates, as described above in relation to the security controls.

Similar to the stored mapping of security controls to templates described above in relation to table, in some examples the mapping of attack steps to templates are stored. An example of such a mapping table is shown in Table 7, as follows:

TABLE 7

Attack Step to Template Mapping

| ID | Description | Subjects | Verbs | Object | Template |
|---|---|---|---|---|---|
| S1 | Send malicious message | ['messages'] | ['send'] | None | [T_1] |
| S2 | Exploit kernel vulnerability | ['kernel', 'vulnerability'] | ['exploit'] | None | [T_2] |

Figure 3E:
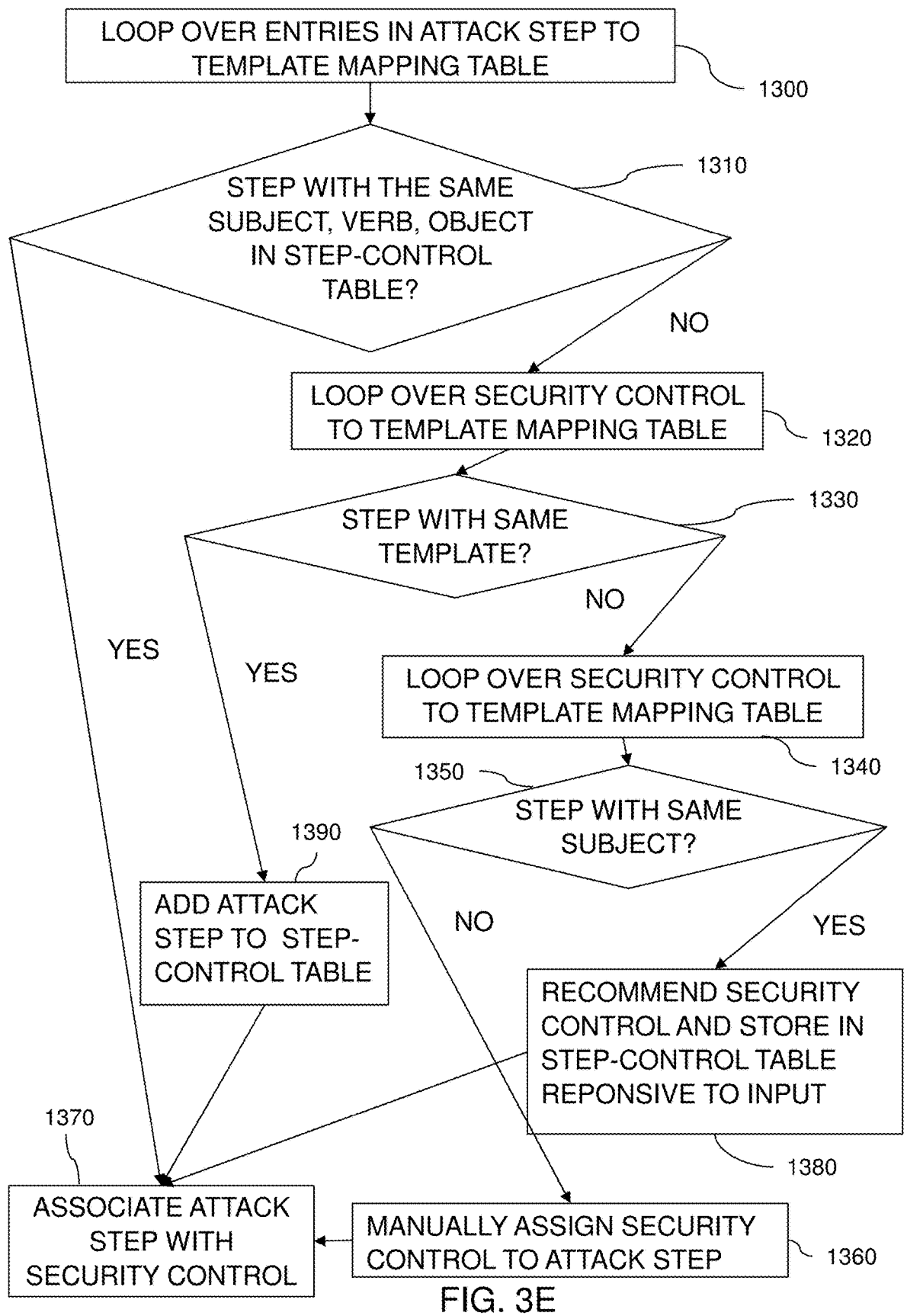

FIG. 3E illustrates a high-level flow of a process for matching attack steps to security controls, utilizing instruction set 304. In some examples, in stage 1300, the attack step to template mapping table (described above in relation to Table 7) is looped over. It is noted that the method can be performed for data stored in any format, and a table is given merely as an example.

In some examples, for each attack step in the table, in stage 1310, a step-control table is analyzed to determine whether an attack step with the same subject, verb and/or object is stored in the step-control mapping table, where for each security control, the data of the respective security control is stored along with the respective template and associated one or more security controls. It is noted that the method can be performed data stored in any format, and a table is given merely as an example. An example of a step-control mapping table is given in Table 8, as follows:

TABLE 8

Step to Control mapping

| Step_id | Description | Subject | Verbs | Object | Template | Control_id |
|---|---|---|---|---|---|---|
| S1 | Send malicious message | Message | Send | None | [T_1] | Control-1 |
| S2 | Exploit kernel vulnerability | Kernel | Exploit | Vulnerability | [T_1] | Control-2, Control-4 |

Although Table 8 is shown as comprising: the description of the attack step, along with the subject, verbs and objects; the associated template; and the associated one or more security controls, this is not meant to be limiting in any way. In some examples, the step-control mapping table comprises more, or less, features without exceeding the scope of the disclosure.

In some examples, in the event that such an attack step is not found in the step-control mapping table, in stage 1320, the process loops over the security control to template mapping table (described above in relation to Table 5) to identify one or more security controls mapped to the template that is also mapped to the respective attack step in the template mapping table (described above in relation to Table 7). In some examples, in stage 1330, for each attack step, it is determined whether the security control to template mapping table contains a security control having the same template as the respective attack step.

In some examples, in the event that such a security control is not found in the security control to template mapping table, in stage 1340, for each security control stored in security control to template mapping table, the process loops over the security control to template mapping table, as described above. In some examples, in stage 1350, for each attack step, it is determined whether security control to template mapping table contains a security control whose text has the same subject and/or verb as the respective attack step.

In some examples, in the event that such a security control is not found in the security control to template mapping table, in stage 1360 management subsystem 11 prompts the user to manually assign one or more security controls to the respective attack step to a respective security control (or manually assign one or more attack steps to a respective security control).

In some examples, in stage 1370, responsive to a received user input assigning a security control to an attack step (or vice-versa), the attack step is associated with the respective security control and optionally stored in the step-control mapping table. The verb "associate" as used herein means establishing a predetermined relationship between two elements. This can include, without limitation: adding the information of one element to the data of the other element; storing both elements in a certain location or configuration such that when the data of one element is accessed the data of the other element is also accessed; and/or storing a predetermined indication, such as in a mapping table, that the two elements are associated with each other.

In some examples, in the event that in stage 1350 it is determined that a security control with the same subject and/or verb exists in the security to template mapping table, in stage 1380 the identified security control and the respective attack step are output to the user as a recommendation, and responsive to a user input approving the recommendation the identified security control is associated with the respective attack step, and optionally stored in the attack step to security control mapping table.

In some examples, in the event that in stage 1330 it is determined that an attack step with the same associated template exists in the attack step to template mapping table, in stage 1390 the identified attack step is associated with the respective security control and optionally stored in the step-control mapping table. In some examples, the identified attack step and the respective security control are output to the user as a recommendation, and responsive to a user input approving the recommendation the identified attack step is associated with the respective security control.

Attack Path Mapping

Figure 4A:
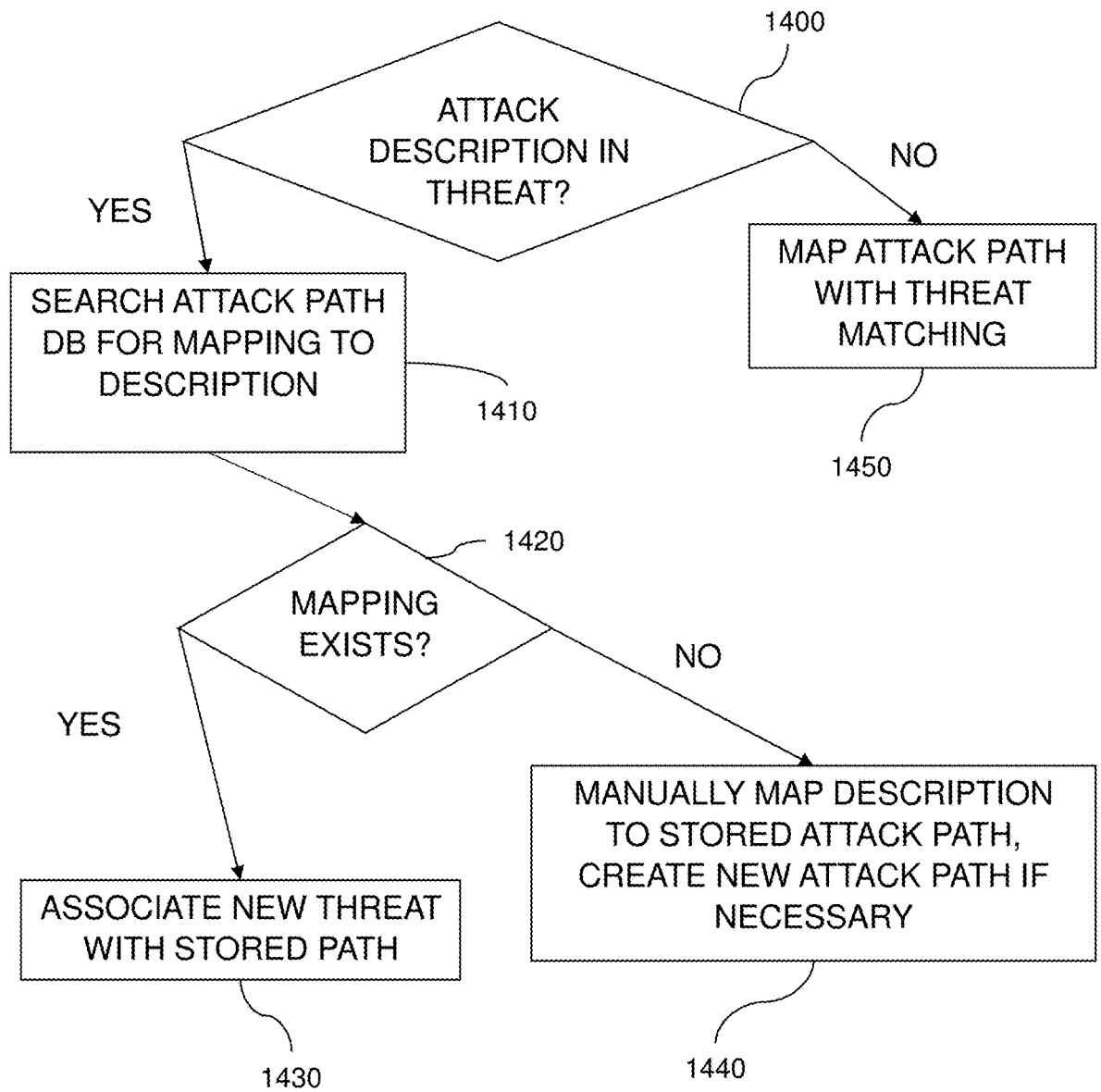
FIGS. 4A-4B illustrate various diagrams of a process for matching stored attack paths to new threats, in accordance with some examples of the present disclosure.

FIG. 4A illustrates a high-level flow of a process for mapping attack paths to threats, utilizing instruction set 301. The mapping may be performed by mapping one or more attack paths to the threats. In some examples, the mapping may be performed by mapping an attack tree to the threats, the attack tree comprising one or more attack paths. In some examples, in stage 1400, instruction set 301 analyzes the information of each threat in the received risk analysis information 190 to identify whether the respective information comprises a description of an attack path, and/or a description of an attack. In some examples, a text search is performed to identify one of the terms "attack path", "attack tree" or "attack description". In some examples, the attack description is identified by performing a text search based on predefined attack step types, as described above in relation to Table 1. In some examples, the identification is based on information stored in a configuration file regarding the location of the potential attack path/tree/description. In some examples, a description of an attack is a general description of the attack, while a description of an attack path or attack tree describes more detailed steps of the attack.

In some examples, in the event that it is determined that risk analysis information 190 of a particular threat contains a description of an attack path/attack paths or an attack description, in stage 1410 the process searches threat to attack path mapping database 303 for a stored mapping. The stored mapping can be a mapping between the identified attack description and a stored attack tree, or one or more attack paths, and/or a mapping between the identified attack path/attack paths description and a stored attack tree or one or more attack paths.

In some examples, in the event that in stage 1420 it is determined that such a mapping exists, in stage 1430 the newly received threat is associated with the stored attack tree or attack path/s. In some examples, in the event that in stage 1420 it is determined that such a mapping does not exist, in stage 1440 management subsystem 11 outputs a prompt to a user to manually map the attack path/attack paths description, or attack description, of the received threat to a respective one of the plurality of attack trees or attack path/s stored in attack path database 302. In some examples, the new mapping is stored in threat to attack path mapping database 303. In some examples, if an appropriate attack tree or attack path is not stored in attack path database 302, the user can manually create a new attack tree, or new attack path/s and the new attack tree (or new attack path/s) is then stored in attack path database 302.

Figure 4B:
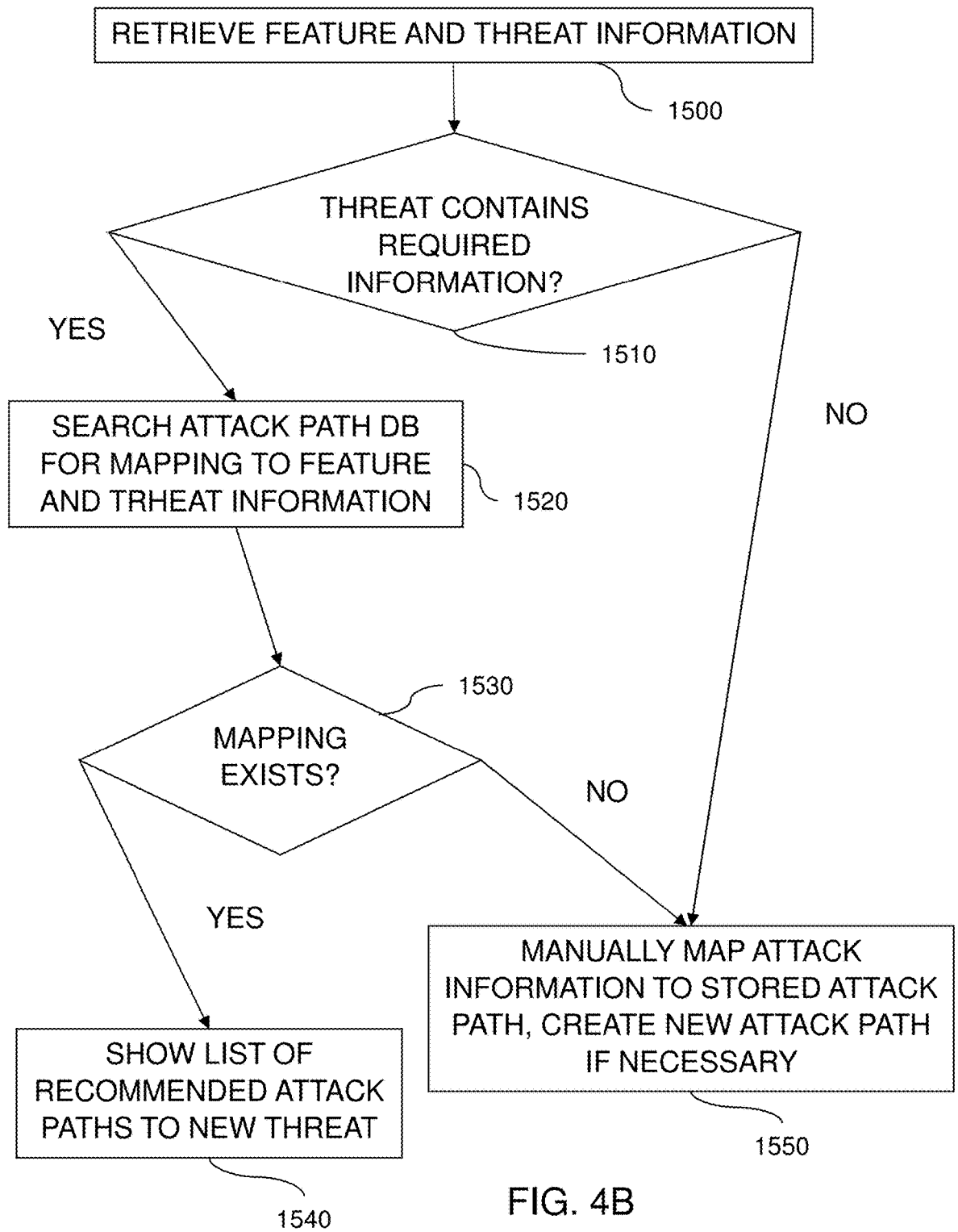

In some examples, in the event that in stage 1400 it is determined that risk analysis information 190 of a particular threat does not contain an attack path/attack paths description or an attack description, in stage 1450 a process is performed to map an appropriate attack tree, or attack path/s, as will be described in relation to FIG. 4B. Particularly, FIG. 4B illustrates a high-level flow of a process for mapping attack trees, or attack path/s, to threats based on threat matching, utilizing instruction set 301.

In stage 1500, feature and threat information is retrieved from risk analysis information 190. In some examples, as shown below in Table 9, the feature information comprises: the name of the item associated with the threat; the name of the asset associated with the threat; and a software feature or data asset associated with the threat (e.g., "spoofing the identity of signal routing"). In some examples, the threat information comprises a list of threats. Although Table shows the above-described features, this is not meant to be limiting in any way. In some examples, more, or less, features can be extracted without exceeding the scope of the disclosure.

TABLE 9

| Item name | Asset name | HW features | SW Feature/ Data asset | List of threats |
|---|---|---|---|---|
| Telematic-control-unit | Signal-manager | 'Interfaces': [CAN, Ethernet] | communication | [Spoofing, Tampering, Integrity] |
| Telematic-control-unit | Signal-manager | 'Interfaces': [CAN, Ethernet] | [ OTA update] | [Spoofing, Tampering, Integrity] |
| Telematic-control-unit | Signal-manager | 'Interfaces': [CAN, Ethernet] | [ Signal routing] | [Spoofing, Tampering, Integrity] |

In some examples, in stage 1510, the process determines whether the received threat contains the required information, such as the information described in relation to Table 9. In some examples, the required information is an asset profile and a list of threats. In some examples, the information is identified by performing a text search based on predefined formats of items, assets, features and/or threats, such as described in relation to Table 9. In some examples, the identification is based on information stored in a configuration file regarding the location of the information.

In some examples, in the event that the process determines that the received threat contains the required information, in stage 1520 the process searches threat to attack path mapping database 303 to determine whether a mapping exists between the respective information (such as the asset profile of the threat and the list of threats, and a stored attack tree, or one or more attack paths. In some examples, the asset profile contains all of the features of the threat. Thus, in the example shown in Table 9, the process searches for a mapping that contains the relevant asset, the relevant hardware artifacts and the relevant software features, signal assets or data assets.

In some examples, in the event that the process determines in stage 1530 that such a mapping (or a plurality of mapping) exists, in stage 1540 management subsystem 11 outputs to the user recommended attack trees, or attack path/s, for the new threat, in accordance with the identified mappings.

In some examples, in the event that the process determines in stage 1530 that such a mapping does not exist, in stage 1550 management subsystem 11 outputs a prompt to a user to manually map the attack path/attack paths, or attack description, of the received threat to a respective one of the plurality of attack trees (or attack path/s) stored in attack path database 302. In some examples, the new mapping is stored in threat to attack path mapping database 303. In some examples, if an appropriate attack tree (or one or more attack paths) is not stored in attack path database 302, the user can manually create a new attack tree (or one or more attack paths) and the new attack tree (or one or more attack paths) is then stored in attack path database 302.

Figure 5A:
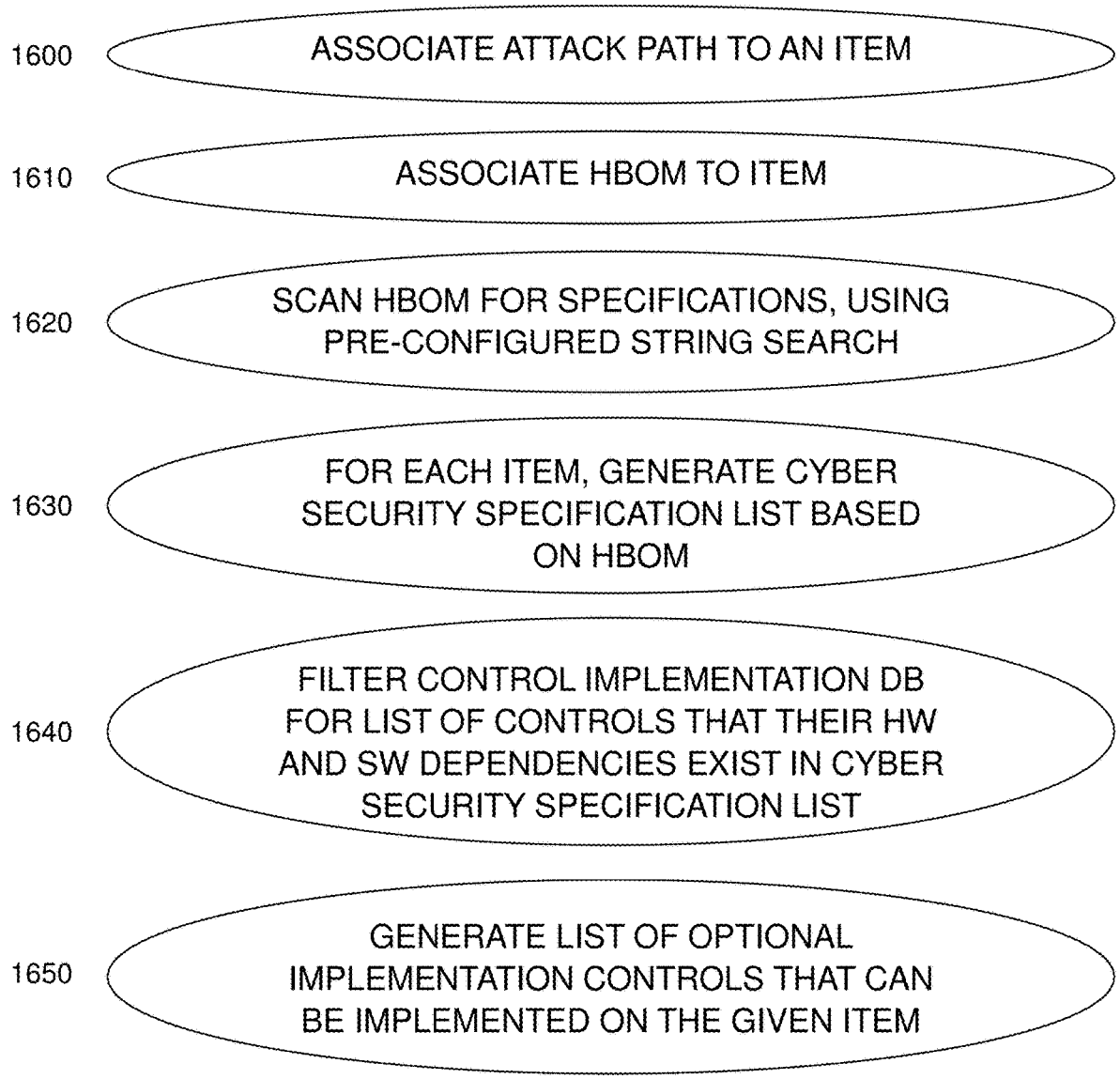
FIGS. 5A-5D illustrate various diagrams of a process for generating an optimized security control implementation list, in accordance with some examples of the present disclosure.

FIG. 5A illustrates a high-level flow of a process of security control optimization subsystem 60 for generating a list of security control implementations. In some examples, in stage 1600, an attack tree (or one or more attack paths) stored in attack path database 302 is associated with a hardware item. In some examples, as described above, the association is performed in accordance with a mapping stored in threat to attack path mapping database 303. In some examples, in stage 1610, HBOM information is associated with the hardware item of stage 1600. As described above, in some examples the HBOM is provided by hardware repository 180.

In some examples, in stage 1620, attack step implementation mapping subsystem 40 scans HBOM list 183 for specifications, such as a hardware security module (HSM), a memory protection unit (MPU), the system architecture and/or any relevant interfaces. In some examples, HBOM list 183 is scanned utilizing a linguistic comparison, such as a predetermined string search.

In some examples, in stage 1630, for each item, attack step implementation mapping subsystem 40 generates a cyber security specification list, based at least in part on resources identified in HBOM list 183. In some examples, the cyber security specification list comprises the resources of HBOM list 183 that allow implementation of security controls.

In some examples, in stage 1640, security control implementation database 201 is filtered by security control optimization subsystem 60 to identify only security control implementations which have hardware dependencies (and also optionally software dependencies) on the respective cyber security specification list of the hardware item.

In some examples, in stage 1650, security control optimization subsystem 60 generates a list of identified security control implementations, associated with the respective attack steps of the attack tree (or one or more attack paths) of the respective threat, that can be implemented on the respective item. In some examples, security control optimization subsystem 60 outputs the generated list. In some examples, management subsystem 11 outputs the generated list on a user display. In some examples, an attack step implementation mapping 70 is further output.

In some examples, attack step implementation mapping 70 comprises mapping details of the security control implementations, e.g., how the security controls are implemented in associated with HBOM list 183 and/or SBOM files 174. More examples of attack step implementation mapping 70 will further be described below.

Figure 5B:
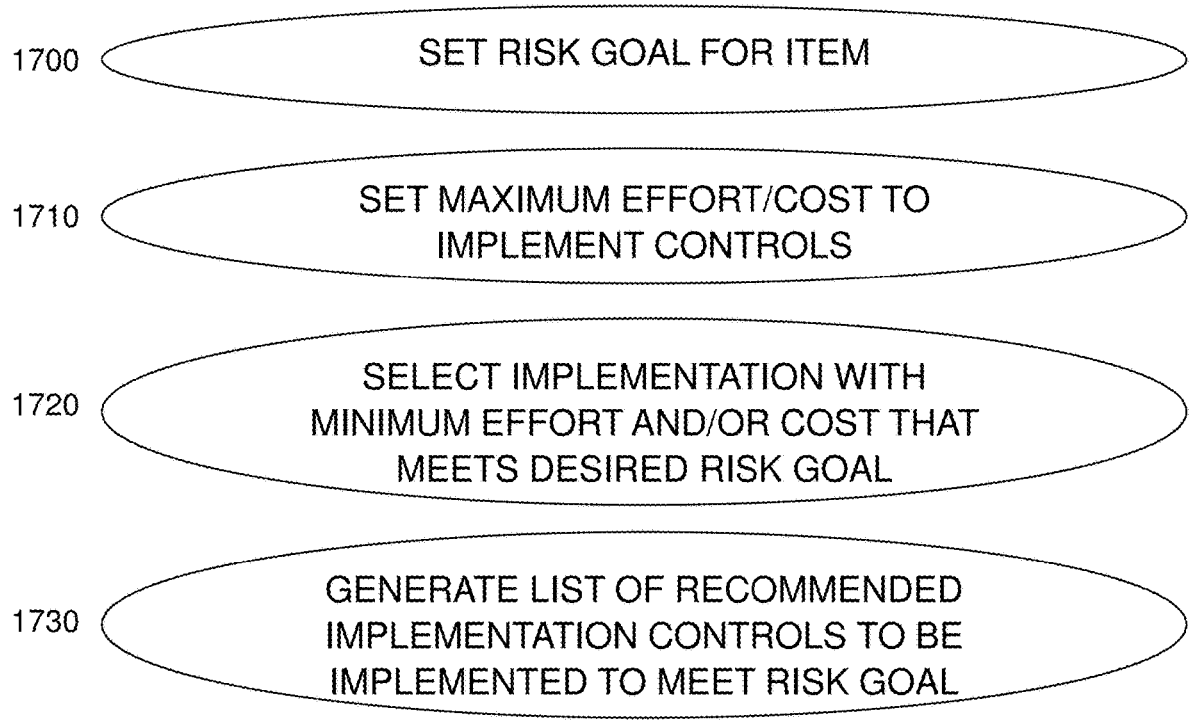

FIG. 5B illustrates a high-level flow of a process of security control optimization subsystem 60 for further optimizing the security control implementation list of stage 1650. In some examples, in stage 1700, a risk goal for the item is set. In some examples, the risk goal is at least partially based on data in risk analysis information. 190. In some examples, maximum effort and/or cost values are set for security control optimization subsystem 60, as will be described below. In some examples, a security depth value is set for security control optimization subsystem 60. The term "security depth value", as used herein, means the number of different resources being acted upon by selected security control implementations.

In some examples, in stage 1720, optionally for each security control, security control optimization subsystem 60 selects the security control implementation that meets the desired risk goal with minimum effort and/or cost, and/or maximum coverage, as will be further described below in relation to FIG. 5C. In some examples, a plurality of security control implementations is selected such that the plurality of security control implementations, in combination, meet the desired risk goal. In some examples, the security control implementations are selected such that they meet the required security depth value.

In some examples, in stage 1730, based at least in part on the selected implementations of stage 1720, security control optimization subsystem 60 optimizes the list of security control implementations that should be implemented in order to meet the risk goal. In some examples, security control optimization subsystem 60 outputs the generated list. In some examples, management subsystem 11 outputs the generated list on a user display.

Figure 5C:
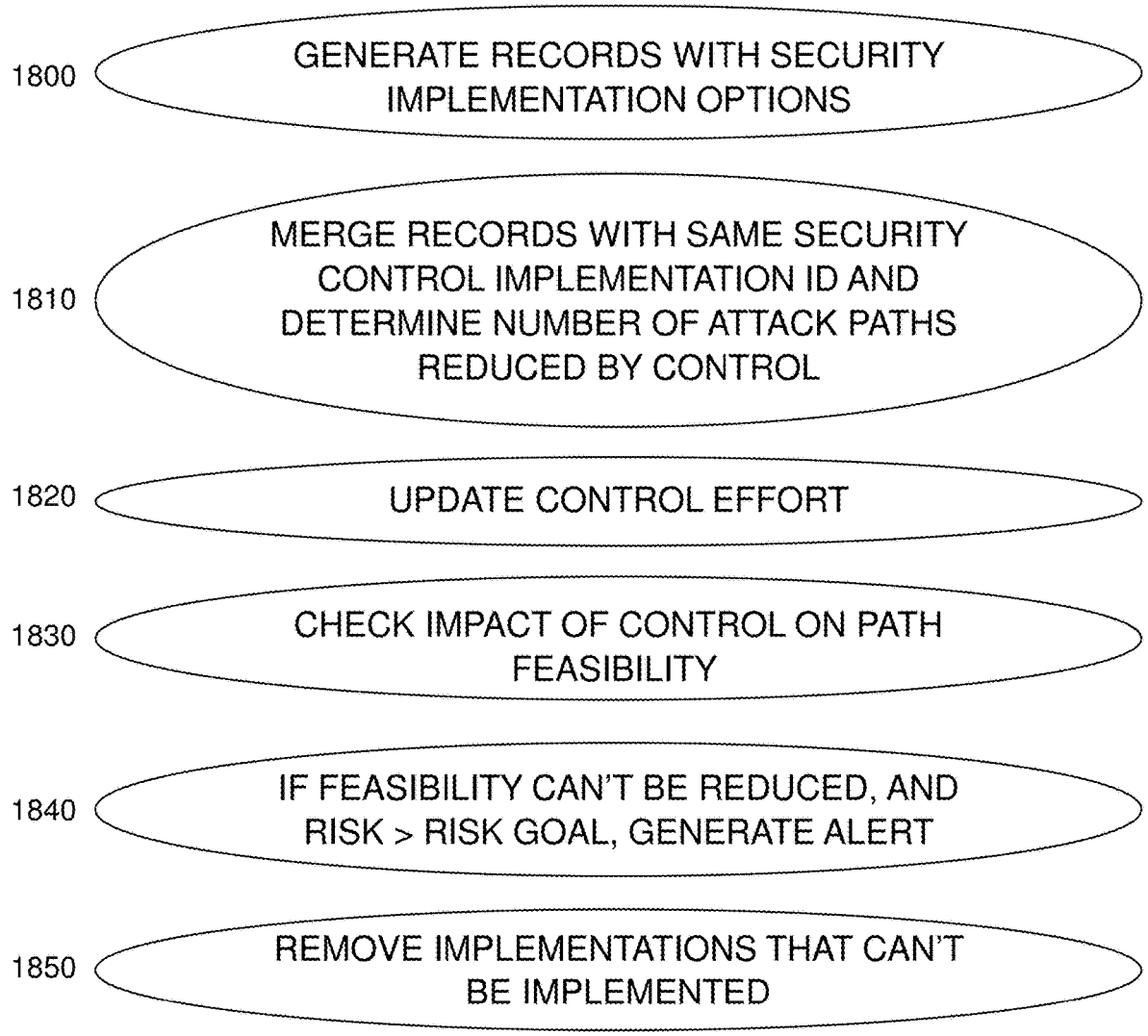

FIG. 5C illustrates a high-level flow of a process of security control optimization subsystem 60 for selecting security control implementation with minimum cost effort and/or cost, and/or maximum coverage. In some examples, in stage 1800, for each attack step of each attack tree (or each attack path) of each threat of each asset of each item of each threat model, security control optimization subsystem 60 identifies the associated security control implementation, as described above. However, it is noted, as described above, that security controls may be assigned only to a portion of the attack steps. In some examples, data associated with the attack step comprises the ID of the respective attack step, the ID of the associated security control implementation, a value indicating the risk reduction caused by the security control implementation, the number of attack paths affected by the security control implementation and the effort required to implement the security control implementation.

In some examples, in stage 1810, for each security control implementation, security control optimization subsystem 60 determines the number of attack paths that are treated by this particular security control implementation.

In some examples, in stage 1820, the implementation effort value for the respective security control implementation is updated by security control optimization subsystem 60. The term "implementation effort", as used herein, means the amount of time and/or resources required to implement the respective security control implementation. In some examples, a predetermined function provides a value based at least in part on weighted values of time and resources in order to determine the implementation effort value. In some examples, in the event that the respective security control implementation has already been implemented, in some examples the implementation effort value is set to zero. A method for checking whether a security control implementation has already been implemented is described below in relation to FIG. 5D.

In some examples, in stage 1830, for each security control implementation described above, security control optimization subsystem 60 determines the effect of the respective security control implementation on the overall feasibility of the attack path or attack tree. In some examples, the score is a predetermined function of the coverage of the security control implementation (i.e., how many attack paths, or attack steps, are treated by the security control implementation), the implementation effort value of the security control implementation and the amount of risk reduction provided by the respective security control implementation. In some examples, a score is determined by security control optimization subsystem 60, the score defined as:

Score=(coverage×weight1+reduced_risk×weight2−weight3×effort)/max_score.

Where coverage' is the number of attack paths or attack steps (i.e., the coverage value), in a single attack tree (or attack path) or in a plurality of attack trees (or attack paths) of different threat models; 'reduced_risk' is a value indicating how much the overall risk level was reduced by; and 'max_score' is a value that is updated every time 'score' is greater than the current 'feasibility max score'. In some examples, 'reduced_risk' is determined by risk subsystem 65. It is further noted that the coverage value includes the number of attack paths treated in multiple threats of multiple items by a single security control implementation. In some examples, weights 1-3 are adjustable responsive to a user input. In some examples, 'score' is continuously calculated until the risk goal is met or a predetermined time period has elapsed. Utilizing the final risk score, in some examples, security control optimization subsystem 60 outputs optimized security control list 80 such that the security control implementations have their scores associated therewith. In some examples, the scores are output. In some examples, the security control implementations are listed in the order of their score.

Table 10 shows an example of an optimized security control implementation list 80, as follows:

TABLE 10

| ID | TARA_ID | Effort | No. attack steps | Score |
|---|---|---|---|---|
| WP.1_impl_1 | [ADAS1223:TCU112: SIGNAL_ROUTING_1: SPOOFING222:STEP123] | 0 | 2 | 1 |
| WP.1_impl_2 | [ADAS1223:TCU112: SIGNAL_ROUTING_1: SPOOFING222:STEP123] | 2 | 2 | 0.89 |
| WP.2_impl_1 | [ADAS1223:TCU112: SIGNAL_ROUTING_1: SPOOFING222:STEP555, ADAS1223:TCU112: SIGNAL_ROUTING_1: SPOOFING222:STEP444] | 20 | 6 | 0.83 |
| WP.1_impl_3 | [ADAS1223:TCU112: SIGNAL_ROUTING_1: SPOOFING222:STEP123] | 10 | 2 | 0.80 |
| WP.2_impl_2 | [ADAS1223:TCU112: SIGNAL_ROUTING_1: SPOOFING222:STEP123] | 1 | 2 | 0 |

As shown in the example of Table 10, the security control list 80 comprises: the ID of the respective security control implementation; the ID of the respective threat, or threats, received in risk analysis information; the implementation effort value for the respective security control implementation; the number of attack steps treated by the respective security control implementation; and the 'score'.

In some examples, in stage 1840, in the event that feasibility of an attack path can't be reduced, and if the risk is still above the defined risk goal, security control optimization subsystem 60 generates an alert. In some examples, the alert comprises sending a report, as describe, for example in Table 11:

TABLE 11

Threat reduction alert

| ID | Model-id | Asset-id | Threat-id | Attack-path-id | Damage-scenario | risk |
|---|---|---|---|---|---|---|
| Alert1 | Model1 | Asset-1 | Threat-1 | [attack-1] | Damage-1 | R1 |

As shown in the example of Table 11, an alert may comprise the IDs of the model, the asset, the threat, the attack path, the damage scenario (i.e. what can be damaged by the respective attack) and the risk value.

In some examples, in stage 1850, for a given HBOM and SBOM, in the event that a particular security control implementation can't be implemented due a problem with resource dependencies, the score of that security control implementation is set to zero. That way this security control implementation is no longer used.

Figure 5D:
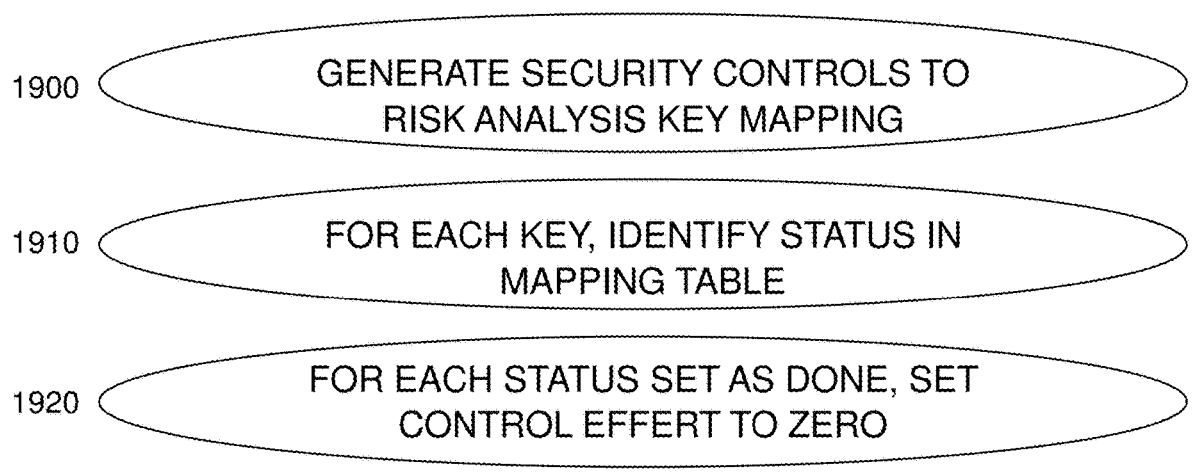

FIG. 5D illustrates a high-level flow of a process of security control optimization subsystem 60 for determining whether a security control implementation has already been implemented. In some examples, in stage 1900, security control optimization subsystem 60 maps each security control implementation to a respective TARA Key. As described above in relation to Table 10, each security control implementation can be associated with an ID of the respective threat or threats. In some examples, each TARA Key comprises the following format:

TARA-model-id: Item-id: TARA-asset-id: TARA-threat-id: TARA-step-id.

For example, a TARA Key can be: Security control implementation1→Model1: Item1: Asset1: Threat1: Attack tree1: Attack step1.

In some examples, in stage 1920, for each TARA Key, security control optimization subsystem 60 identifies the status of the respective security control implementation in the TARA to security implementation data.

In some examples, for each security control implementation whose status is set as "done", security control optimization subsystem 60 sets the respective implementation effort value as zero.

In some examples, a user input is received, indicating that the respective security control was implemented (such as described above). In some examples, security control optimization subsystem 60 identifies one or more attack paths that are associated with the implemented security control. In some examples, such an attack path is identified by identifying one or more attack steps that have the respective security control associated therewith. In some examples, as described above, an initial risk level of each threat is received. In some examples, security control optimization subsystem 60 defines a residual risk level of the respective threat after implementation of the respective security control. The term "residual risk level", as used herein, means the risk level after implementation of the respective security control. In some examples, security control optimization subsystem 60 outputs the defined residual security control, optionally via output subsystem 130.

Figure 6A:
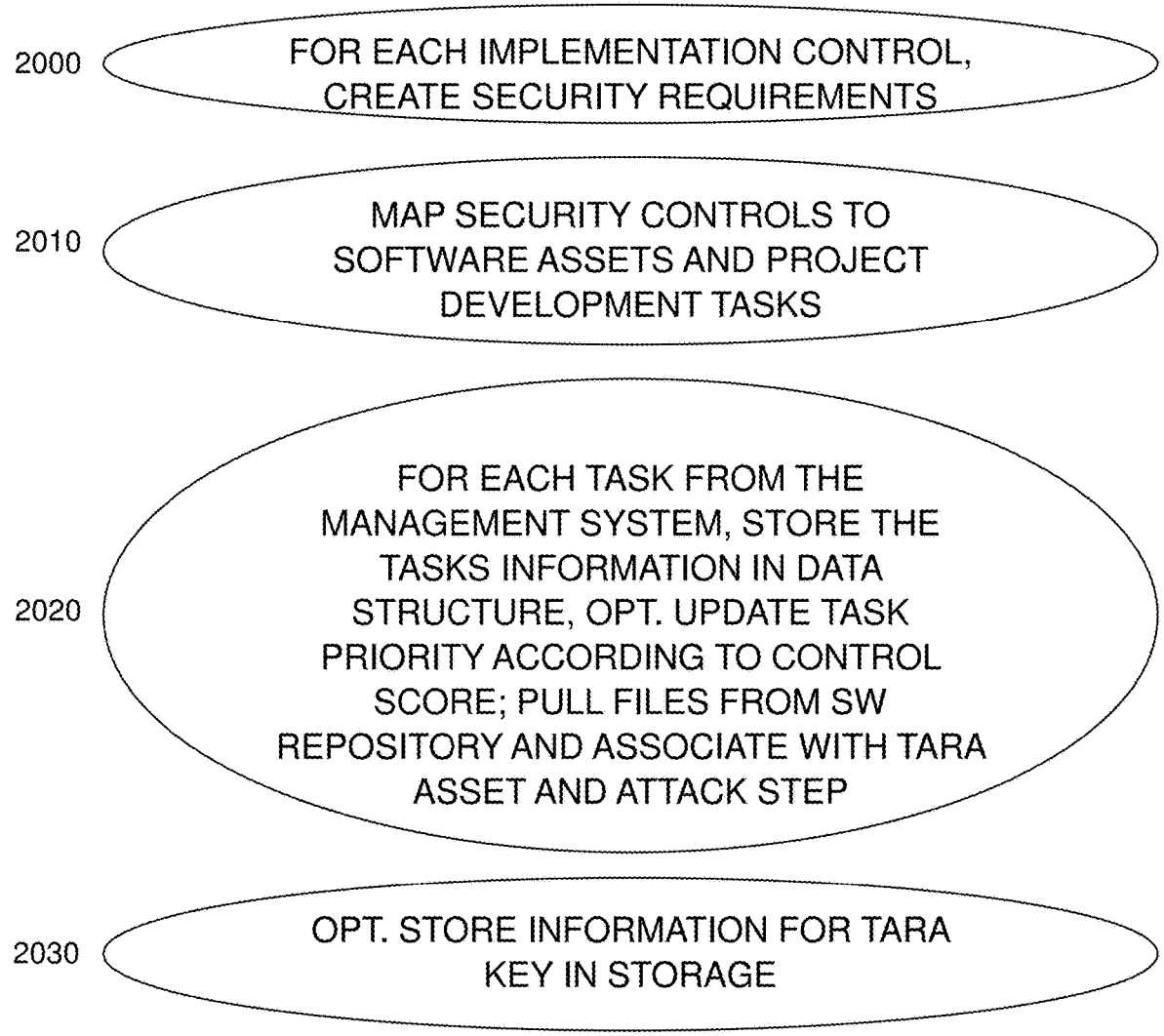
FIGS. 6A-6C illustrates various diagrams of a process of creating a database of software implementation mapping to attack steps of risk analysis information, in accordance with some examples of the present disclosure.

FIG. 6A illustrates a high-level flow of a process of attack step implementation mapping subsystem 40 for mapping security control implementations to software assets and project development tasks. In some examples, in stage 2000, for each security control implementation, subsystem 40 generates security requirements, optionally within a requirements tool. In some examples, the requirement contains: an attack step description; a description of attack steps to be mitigated; and a unique key: e.g., TARA-model-id:Item-id: TARA-asset-id:TARA-threat-id:TARA-step-id. For example, a TARA Key can be:

ADAS1223: TCU112: SIGNAL_ROUITING_1: SPOOFING222: STEP123

In some examples, in stage 2010, attack step implementation mapping subsystem 40 maps security control implementations to software assets and project development tasks. In some examples, TARA threats are done on software or data assets of an item, for example, spoofing signal manager of an in-vehicle infotainment (IVI) system, which can compromise the integrity of an OTA update. Security controls are associated with the threats, and are therefore associated with the software or data assets, as described above. In some examples, attack step implementation mapping subsystem 40 queries PLM system 800 for all tasks with a description that contains the software/data asset names (e.g., get all tasks of project X, of type Epic, with "software asset" in the name or description).

In some examples, in stage 2020, for each task received from management subsystem 11, the task information is stored in a data structure, as further described below in relation to FIG. 6B, in the "Tasks" section of Table 12.

In some examples, attack step implementation mapping subsystem 40 updates the task priority according to the score described above. In some examples, using the reference to the respective security control implementation, attack step implementation mapping subsystem 40 pulls some, or all, of the software and configuration files from software repository 170 and associate the TARA asset with the respective attack steps.

In some examples, in stage 2030, a unique key is provided, such as the following: TARA-model-id:Item-id: TARA-asset-id:TARA-threat-id:TARA-step-id, as described above. In some examples, attack step implementation mapping subsystem 40 stores some, or all, information for this key in storage. For example, these can be stored in a buck, where in the bucket there are keys that points to an object, and the object can be a .zip file with all the necessary information.

Figure 6B:
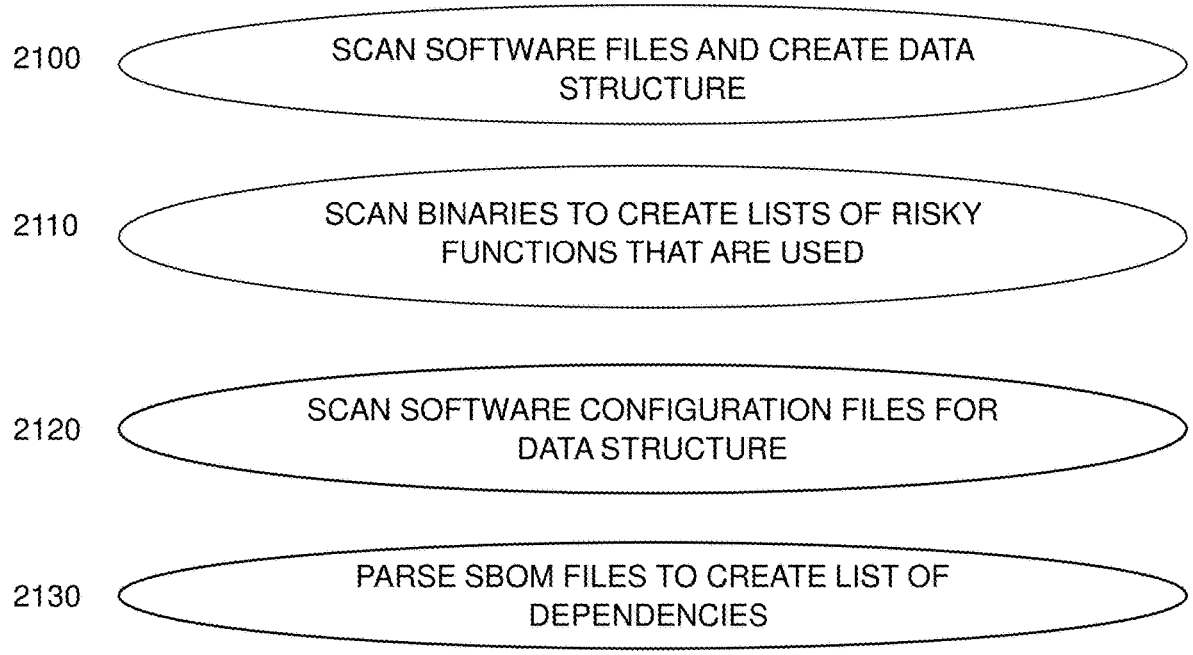

FIG. 6B illustrates a high-level flow of a process of attack step implementation mapping subsystem 40 for generating a data structure. In some examples, in stage 2100, software files are scanned using methods such as text search, and/or code analysis based on language syntax (C, C++, JAVA). In some examples, attack step implementation mapping subsystem creates a data structure. An example of the data structure is given in Table 12, shown below. As shown, Table 12 comprises: the TARA ID; the threat ID; the associated tasks; requirements associated with the item; respective software artifacts; and SBOM information. In some examples, as shown in Table 12, the software artifacts are associated with any of the software assets, data assets and/or signal assets associated with the received risk analysis information.

In some examples, attack step implementation mapping subsystem 40 scans the binaries of the item to create lists of risky functions that are used. In some examples, identification of risky functions is performed using predetermined disassembly methods, as known to those skilled in the art. In some examples, the risky functions are added to the data structure of stage 2100 and/or a new data structure is created for this purpose.

In some examples, in stage 2020, attack step implementation mapping subsystem 40 scans software configuration files from software repository 170 (e.g., adaptive AUTOSAR manifest platform and manifest files) that are associated with the item. In some examples, this information is further added to the data structure of stage 2100 and/or a new data structure is created for this purpose.

TABLE 12

| TARA to Implementation mapping ||||||
| ID | Threat_id | Tasks | Requirements | Software-artifacts | SBOM |
| --- | --- | --- | --- | --- | --- |
| TARA-model-id:Item-id:TARA-asset-id:TARA-threat-id:TARA-step-id | TARA-threat-id:TARA-step-id | [ {"id":UUID "status":Enum "Effort":String } ] | Array of UUID of requirements ids from requirement system | { "crypto": { "is_used": [Boolean], "callee": [list of functions using crypto library] }, "risky_functions": [ { "function": "memcpy", "callee": [list of functions calling] ], "servers":[ { "ips":[List of ips], "ports":[list of ports]}, "protocols":[list of protocols], "signals":[list of signals names] } ], | "Dependencies":[ List of code dependencies ] |

TABLE 12-continued

TARA to Implementation mapping

| ID | Threat_id | Tasks | Requirements | Software-artifacts | SBOM |
|----|-----------|-------|--------------|--------------------|------|
|    |           |       |              | "clients": [ { "ips":[List of ips], 'ports":[list of ports]}, "protocols":[list of protocols] } ] } "dependencies":[ list of dependencies ] |      |

In some examples, in stage 2030, attack step implementation mapping subsystem 40 parses the SBOM files (e.g. SPDX file) to create a list of some, or all, of the dependencies. In some examples, this information is further added to the data structure of stage 2100 and/or a new data structure is created for this purpose.

Figure 6C:
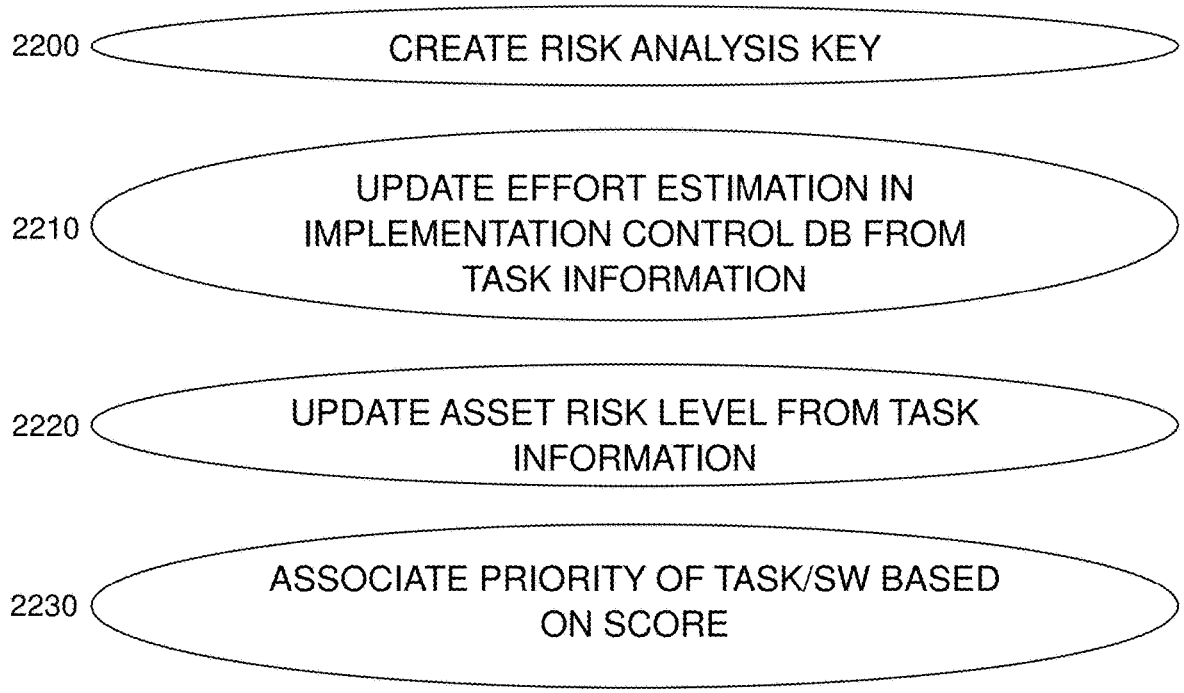

FIG. 6C illustrates a high-level flow of a process of attack step implementation mapping subsystem 40 of mapping attack steps to software configuration data. In some examples, in stage 2200, attack step implementation mapping subsystem 40 creates a unique key, as described above. In some examples, as described above, the unique key is generated for each attack step of each asset of each item of each threat model.

In some examples, in stage 2210, attack step implementation mapping subsystem 40 updates the effort estimation of security control implementation stored in security control implementation database 201 based at least in part on information that is stored in the "Task" section of the above-described data structure. In some examples, in stage 2220, attack step implementation mapping subsystem 40 updates the asset risk level according to the task status of the data structure.

In some examples, the term "risk level", as used herein, is defined as a predetermined function of the respective feasibility rating and the respective impact value. In some examples, the impact value is a numerical indication of the impact that a particular threat will have on the respective asset (or on the item itself) if the respective threat is realized. In some examples, impact values are assigned numerical values, as known to those skilled in the art.

In some examples, in stage 2230 attack step implementation mapping subsystem 40 associate the priority of the task/software based on the score (described above) of the security control that is associated therewith. Thus, the score can be used to prioritize software testing and validation. In some examples, attack step implementation mapping 70 comprises the priority of the task/software and optionally the risk levels associated with each item/asset.

In some examples, data logger configuration subsystem 61 defines priorities of potential signals, the priorities defined based at least in part on the risk level of the threats associated with an asset that can send the respective potential signal such that an increased risk level of a signal source translates to a higher priority for the respective signal. In some examples, data logger configuration subsystem 61 generates configuration data for a data logger, the configuration data indicating the defined priorities of the potential signals. In some examples, the generated configuration data 85 is output. In some examples, configuration data 85 is stored in a file in a predetermined format.

Figure 7:
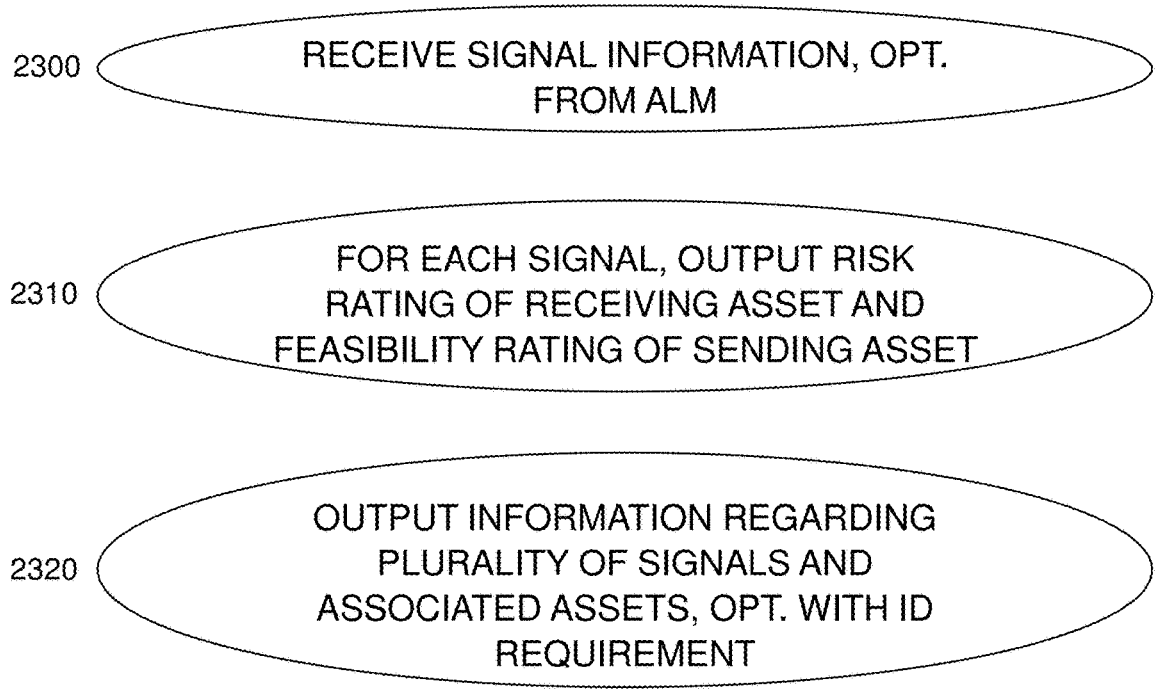
FIG. 7 illustrates a high-level flow chart of a method for outputting information regarding signals transmitted between assets.

Thus, for a vehicle having a data logger that receives messages from the networks and sends samples to the backend for continuous analysis/training, the generated configuration data can be used to prioritize the information sent, based on the priorities of the signals. Therefore, if there is a constraint on the amount of data that can be sent, the data logger will log data of signals having a high priority first. FIG. 7 illustrates a high-level flow chart of a method for outputting information regarding signals transmitted within an item. In stage 2300, signal subsystem 62 receives information regarding at least one signal transmitted within an item. In some examples, the information is received from ALM system 800. In some examples, the received information comprises identifying information of an asset within the item that sent the signal and an asset within the item that received the signal. In some examples, information is received regarding a plurality of signals within the item.

In stage 2310, in some examples, for each signal of stage 2300, the risk level (described above) of one or more threats associated with the asset that received the signal is output. In some examples, for each signal of stage 2300, the feasibility rating (described above) of one or more threats associated with the asset that sent the signal is output.

In stage 2320, in some examples, the output information of stage 2310 comprises outputting the received information regarding the plurality of signals and the information regarding the risk level of threats associated with the assets that received the plurality of signals and the feasibility ratings of the threats associated with the assets that sent the plurality of signals. Particularly, in some examples, information regarding the plurality of signals is arranged together in a predetermined format, such as in a graph. In some examples, the information for each of the plurality of signals comprises: identification data of the asset that sent the signal and the asset that received the signal; the information regarding the risk level of one or more threats associated with the asset that received the signal; and the information regarding the risk level of one or more threats associated with the asset that sent the signal.

In some examples, signal subsystem 62 further identifies communication paths between assets. In some examples, the communication paths are identified based at least in part of the received information associated with the plurality of signals. In some examples, the communication paths between assets can be between assets in the same item, and between assets in separate, i.e. communication paths that cross between items.

In some examples, signal subsystem 62 compares the risk levels of assets that are communicating with each other. In some examples, in the event that one or more signals are being sent to an asset having a lower risk level than the risk level of the asset that sent the signal, signal subsystem 62 generates an alert. In some examples, the generated alert is output by output subsystem 130. In some examples, the alert notifies a user that the asset with the lower risk level is actually at a higher risk due to the communication with the higher-risk asset.

In some examples, the comparison of risk levels is not limited to two assets directly communicating with each other. In some examples, signal subsystem 62 identifies a chain of assets, where each of the plurality of assets is in communication with another of the chain of assets. In some examples, signal subsystem 62 compares the risk levels of all assets within the chain. In some examples, that one or more assets within the chain have a higher risk level than other asset/s within the chain, signal subsystem 62 generates an alert, as described above. In some examples, the generated alert is output by output subsystem 130. In some examples, the alert notifies a user that the asset with the lower risk level is actually at a higher risk due to the communication with the higher-risk asset.

In some examples, ID subsystem 63 defines and associates an asset chain identifier (ID) with each asset. In some examples, the asset chain ID is a unique identifier that identifies the threats of each asset within a respective chain of assets (the chain of assets is described above). In some examples, ID subsystem 63 is configured to output information regarding the threats of the assets of the respective chain upon a request that includes the respective asset chain ID.

In some examples, the asset chain ID is output by output subsystem 130. In some examples, the output information associated with each asset comprises the respective asset chain ID. In some examples, ID subsystem 63 defines a requirement for a user to add the asset chain ID when performing tasks associated with the respective asset, such as tracing errors associated with the asset. In some examples, the requirement can be any type of notice to the user. In some examples, ID subsystem 63 further defines a predefined message format and adds the predefined message format to the requirement, such that the user is required to use the predefined message format in association with the respective asset chain ID.

In some examples, permissions subsystem 64 generates, for each asset, information regarding the resources needed by the respective asset and the permissions allowed for the respective asset. The term "permissions", as used herein, means which resources the asset is allowed to access. In some examples, the permissions are based at least in part on a user input.

In some examples, permissions subsystem 64 compares the permissions of the respective asset to the risk level of the asset. In some examples, each risk level has one or more predetermined permissions that are allowed at that risk level. In some examples, if the permissions of the respective asset are not allowed at the risk level of the respective asset, permissions subsystem 64 generates a respective alert. In some examples, the alert is output at output subsystem 130.

In some examples, security control optimization subsystem 60 outputs information regarding one or more security controls associated with the respective asset such that the risk level of the asset can be reduced to a level that will allow the permissions. In some examples, security control optimization subsystem 60 updates security control list 80 accordingly.

In some examples, permissions subsystem 64 compares the permissions of each asset in an item to the risk level of other assets in the respective item. In some examples, if the permissions of the respective asset are not allowed at the risk level of any other asset in the respective item, permissions subsystem 64 generates a respective alert. In some examples, the alert is output at output subsystem 130.

In some examples, security control optimization subsystem 60 outputs information regarding one or more security controls associated with the respective asset such that the risk level of the asset can be reduced to a level that will allow the permissions. In some examples, security control optimization subsystem 60 updates security control list 80 accordingly.

In some examples, permissions subsystem 64 compares the permissions of each asset to the risk level of other assets that are in communication therewith and/or within a chain of assets, optionally based at least in part on an output of signal subsystem 62. In some examples, if the permissions of the respective asset are not allowed at the risk level of any other asset that is in communication with the respective asset, permissions subsystem 64 generates a respective alert. In some examples, the alert is output at output subsystem 130.

In some examples, security control optimization subsystem 60 outputs information regarding one or more security controls associated with the respective asset such that the risk level of the asset can be reduced to a level that will allow the permissions. In some examples, security control optimization subsystem 60 updates security control list 80 accordingly.

Figure 8:
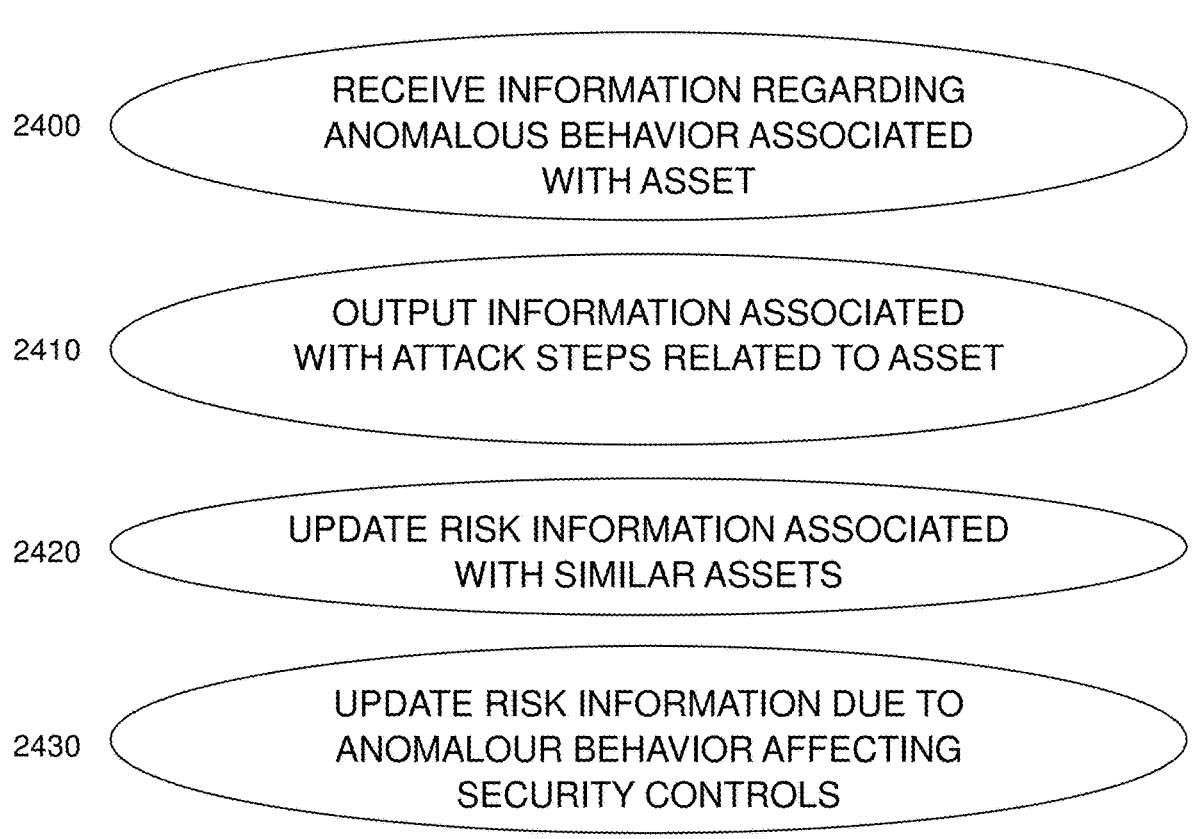
FIG. 8 illustrates a high-level flow chart of a method for outputting information responsive to anomalous behavior.

FIG. 8 illustrates a high-level flow chart of a method for outputting information responsive to anomalous behavior information. The term "anomalous behavior information", as used herein, means information regarding detected anomalous behavior or an indication of a vulnerability that can lead to anomalous behavior. The term "anomalous behavior", as used herein, means any actions that do not meet predefined rules.

In some examples, in stage 2400, anomalous behavior information associated with one or more assets is received. In some examples, the one or more assets are part of a vehicle. In some examples, the one or more assets are part of one or more components in communication with a vehicle.

In some examples, anomalous behavior information can be received from a vulnerability management system that receives alerts regarding Common Vulnerabilities and Exposures (CVEs). In some examples, the CVEs are defined within the National Vulnerability Database (NVD). In some examples, the information is received via ALM system 800.

In some examples, the anomalous behavior information is related to an attack. In some examples, the anomalous behavior information regarding the attack comprises artifacts associated with the attack. In some examples, the anomalous behavior information is associated with a bug.

In some examples, the anomalous behavior information comprises: an identifier of the respective asset; an identifier of the software version of the asset; and/or information regarding an attack interface (i.e., to what interface the attack is related to), if any.

In some examples, in stage 2410, information related to the one or more assets of stage 2400 is output. In some examples, the output information comprises attack paths associated with the one or more assets.

In some examples, in stage 2420, risk subsystem 65 updates a risk level associated with each of the identified assets in stage 2400 and 2410 based at least in part on the received anomalous behavior information. In some examples, the anomalous behavior influences the feasibility of one or more associated attack steps, therefore the risk will increase.

In some examples, risk subsystem 65 then updates the risk level of each of the identified assets. In some examples, the risk level is updated by updating the feasibility of the respective attack step.

In some examples, the anomalous behavior information comprises an indication of one or more resources and one or more software artifacts. In some examples, risk subsystem 65 then identifies any assets having the same resources and/or the same software artifacts (such as defined in Table 12). In some examples, the assets are identified in accordance with risk analysis identifiers associated with the respective resources/software artifacts. In some examples, the risk analysis identifier is an identifier associated with the received risk analysis information, such as a TARA ID, as described above.

In some examples, the output information further comprises attack paths of the identified assets. In some examples, risk subsystem 65 identifies, for each of the identified assets, all attack steps that are related to In some examples, in stage 2430, the anomalous behavior is associated with software that implements one or more security controls. In some examples, security control optimization subsystem 60 outputs information regarding the affected security controls. In some examples, the output information comprises attack steps and/or attack paths treated by the affected security controls. In some examples, risk subsystem 65 updates the risk level associated with one or more assets whose threats are treated by the affected security controls, and outputs the updated risk levels.

In some examples, the anomalous behavior is associated with software that implements a functionality. In some examples, attack step implementation mapping subsystem 40 identifies one or more threats associated with the functionality and outputs information regarding the respective one or more threats.

SOME EXAMPLES OF THE DISCLOSED TECHNOLOGY

Some examples of above-described implementations are enumerated below. It should be noted that one feature of an example in isolation or more than one feature of the example taken in combination and, optionally, in combination with one or more features of one or more examples below are examples also falling within the disclosure of this application.

Example 1. A security control method, the method comprising: receiving risk analysis information comprising data regarding a plurality of threats, each of the plurality of threats associated with a respective asset; loading a control database comprising data regarding a plurality of security controls; for each of the plurality of threats, matching one or more of the plurality of security controls to one or more attack steps of one or more attack paths associated with the respective threat; for each of the plurality of threats, selecting at least a subset of the matched security controls; and for each of the plurality of threats, outputting information regarding the selected security controls, wherein the output information is based at least in part on: expenditure data associated with the respective security controls, the expenditure data indicating a cost and/or effort required to implement the respective security control; and feasibility data associated with the respective security controls, the feasibility data indicating a degree to which the respective security control will reduce a feasibility rating of a respective one of the plurality of attack steps when implemented.

Example 2. The method of any example herein, particularly example 1, wherein the selection of the at least a subset of the matched security controls comprises selecting a subset of the matched security controls based at least in part on the respective expenditure data and the respective feasibility data, and wherein the output information comprises information regarding the selected subset of security controls.

Example 3. The method of any example herein, particularly example 1, wherein the method further comprises determining a respective score for each of the plurality of security controls, the respective score based at least in part on the respective expenditure data and the respective feasibility data, and wherein the output information is based at least in part on the determined scores.

Example 4. The method of any example herein, particularly example 3, wherein the wherein the selection of the at least a subset of the matched security controls comprises selecting a subset of the matched security controls based at least in part on the respective scores, and wherein the output information comprises information regarding the selected subset of security controls.

Example 5. The method of any example herein, particularly example 3, wherein the output information regarding the selected security controls comprises the respective score of each of the selected security controls.

Example 6. The method of any example herein, particularly example 3, wherein the output information regarding the selected security controls is ordered based at least in part on the scores of the selected security controls.

Example 7. The method of any example herein, particularly example 1, wherein the control database further comprises, for each of the plurality of security controls, dependency requirements associated with the respective security control, and wherein the output information is further based on the dependency requirements associated with the matched security controls.

Example 8. The method of any example herein, particularly example 7, wherein the method further comprises: receiving information regarding resources of an item; and comparing the information regarding the resources of the item to the dependency requirements associated with the matched security controls associated with a respective asset within the item, wherein the selection of the at least a subset of the matched security controls comprises selecting a subset of the matched security controls based at least in part on an outcome of the comparison, and wherein the output information comprises information regarding the selected subset of security controls.

Example 9. The method of any example herein, particularly example 7 or 8, wherein the dependency requirements comprise software dependency requirements and hardware dependency requirements.

Example 10. The method of any example herein, particularly any one of examples 7-9, wherein the method further comprises receiving a bill of material, the bill of material comprising the information regarding the resources of the asset.

Example 11. The method of any example herein, particularly example 1, wherein the method further comprises: for each of the security controls matched to the steps of the identified attack paths, determining a respective coverage value, and wherein the wherein the output information is further based on the determined coverage values of the selected security controls.

Example 12. The method of any example herein, particularly example 11, wherein the selection of the at least a subset of the matched security controls comprises selecting a subset of the matched security controls based at least in part on the determined coverage values of the selected security controls, and wherein the output information comprises information regarding the selected subset of security controls.

Example 13. The method of any example herein, particularly example 11, wherein the output information regarding the selected security controls is ordered based at least in part on the determined coverage values of the selected security controls.

Example 14. The method of any example herein, particularly any one of examples 11-13, wherein the coverage value is determined over a plurality of items.

Example 15. The method of any example herein, particularly example 1, wherein the method further comprises: loading an implementation database comprising a plurality of security control implementations, each of the plurality of security controls associated with one or more of the plurality of security control implementations; and for each of the plurality of threats, selecting at least a subset of the security control implementations associated with the matched security controls, wherein the output information comprises information regarding the selected security control implementations.

Example 16. The method of any example herein, particularly example 15, wherein the selection of the at least a subset of the security control implementations comprises selecting a subset of the security control implementations based at least in part on respective expenditure data and feasibility data associated with the selected security control implementation, and wherein the output information comprises information regarding the selected subset of security control implementations.

Example 17. The method of any example herein, particularly example 16, wherein the method further comprises determining a respective score for each of the plurality of security control implementations, the respective score based at least in part on the respective expenditure data and the respective feasibility data associated with the respective security control implementation, and wherein the output information is based at least in part on the determined scores.

Example 18. The method of any example herein, particularly example 17, wherein the selection of the at least a subset of the security control implementations comprises selecting a subset of the security control implementations based at least in part on the respective scores, and wherein the output information comprises information regarding the selected subset of security control implementations.

Example 19. The method of any example herein, particularly example 17, wherein the output information regarding the selected security control implementations comprises the respective score of each of the selected security control implementations.

Example 20. The method of any example herein, particularly example 17, wherein the output information regarding the selected security control implementations is ordered based at least in part of the scores of the selected security control implementations.

Example 21. The method of any example herein, particularly example 15, wherein the implementation database further comprises, for each of the plurality of security control implementations, dependency requirements associated with the respective security control implementation, and wherein the output information is further based on the dependency requirements associated with the selected security control implementations.

Example 22. The method of any example herein, particularly example 21, wherein the method further comprises: receiving information regarding resources of an item; and comparing the information regarding the resources of the asset to the dependency requirements associated with the security control implementations associated with the matched security controls associated with a respective asset within the item, wherein the selection of the at least a subset of the security control implementations comprises selecting a subset of the security control implementations associated with the matched security controls based at least in part on an outcome of the comparison, and wherein the output information comprises information regarding the selected subset of security control implementations.

Example 23. The method of any example herein, particularly example 21 or 22, wherein the dependency requirements comprise software dependency requirements and hardware dependency requirements.

Example 24. The method of any example herein, particularly any one of examples 21-23, wherein the method further comprises receiving a bill of material, the bill of material comprising the information regarding the resources of the asset.

Example 25. The method of any example herein, particularly example 15, wherein the method further comprises: for each of the security control implementations associated with the security controls matched to the steps of the identified attack paths, determining a respective coverage value, and wherein the output information is further based on the determined coverage values of the selected security control implementations.

Example 26. The method of any example herein, particularly example 25, wherein the selection of the at least a subset of the security control implementations comprises selecting a subset of the security control implementations based at least in part on the determined coverage values of the selected security control implementations, and wherein the output information comprises information regarding the selected subset of security control implementations.

Example 27. The method of any example herein, particularly example 25, wherein the output information regarding the selected security control implementations is ordered based at least in part on the determined coverage values of the selected security control implementations.

Example 28. The method of any example herein, particularly any one of examples 25-27, wherein the coverage value is determined over a plurality of items.

Example 29. The method of any example herein, particularly any one of examples 1-28, wherein method further comprises: receiving an initial risk level, the initial risk level defined in accordance with the attack paths of the plurality of threats; receiving a target risk level; and identifying one or more of the attack steps of the plurality of threats that the treatment thereof will achieve the target risk level.

Example 30. The method of any example herein, particularly example 29, wherein the initial risk level is defined as a predetermined function of a respective impact value of the respective threat and a respective feasibility rating of each attack path of each of the plurality of threats.

31. The method of any example herein, particularly any one of examples 29-31, further comprising: for each of the plurality of threats, determining whether the target risk level can be reached; and outputting a list of the plurality of threats that it is determined that the respective target risk level cannot be reached.

Example 32. The method of any example herein, particularly any of examples 29-32, further comprising: receiving a user input indicating that a respective one of the security controls was implemented; identifying one or more respective attack paths associated with the implemented security control; responsive to the identified one or more respective attack paths associated with the implemented security control, defining a residual risk level; and outputting the residual risk level.

Example 33. The method of any example herein, particularly example 32, wherein the identification of the one or more attack paths that the treatment thereof will achieve the target risk level comprises identifying an attack path comprising: at least one step associated with a first resource, wherein treating the at least one step associated with the first resource mitigates or remediates the identified attack path; and at least one step associated with a second resource, wherein treating the at least one step associated with the second resource mitigates or remediates the identified attack path, and wherein the second resource is different than the first resource.

Example 34. The method of any example herein, particularly any one of examples 1-33, further comprising, for each of the matched one or more security controls, adding the respective security control to the respective step of the respective attack path.

Example 35. The method of any example herein, particularly example 34, further comprising: receiving a user input indicating that a respective one of the security controls was implemented; and responsive to the received user input indicating that the respective one of the security controls was implemented, marking the respective security control as being implemented.

Example 36. The method of any example herein, particularly example 1, wherein the method further comprises loading an attack path database comprising a plurality of attack paths, wherein, for each of the plurality of threats, the method further comprises, matching a description contained within the received risk analysis information to a respective one of the plurality of attack paths based at least in part on a previous match of the respective attack path to a similar description, and wherein the description comprises a description of an attack, a description of an attack path and/or a description of an attack tree.

Example 37. The method of any example herein, particularly example 1, wherein, for each of the plurality of assets, the method further comprises matching a profile of the respective asset contained within the respective risk analysis information and a threat list contained within the respective risk analysis information associated with the respective asset to a respective one of the plurality of attack paths based at least in part on a previous match of the respective attack path to an asset profile and threat list at least partially identical to the profile and threat list of the respective asset.

Example 38. The method of any example herein, particularly example 36 or 37, wherein the matching to a respective one of the plurality of attack paths is based at least in part on a linguistic analysis.

Example 39. The method of any example herein, particularly any one of examples 1-38, wherein the matching the one or more of the plurality of security controls to the one or more steps of the attack path comprises performing a respective linguistic analysis of a textual description of each of the plurality of security controls and each of the steps of the attack path.

Example 40. The method of any example herein, particularly example 39, wherein the linguistic analysis of the textual description of each of the plurality of security controls comprises a normalization step wherein one or more words of the textual description are normalized to a respective predetermined format, based at least in part on a respective predetermined list of terms.

Example 41. The method of any example herein, particularly example 1 or 40, further comprising loading a template database comprising data regarding a plurality of templates, each template comprising information regarding an associated resource and information regarding one or more attack steps associated with the respective resource, wherein the matching the one or more of the plurality of security controls to the one or more steps of the attack path is based at least in part on the data regarding the plurality of templates.

Example 42. The method of any example herein, particularly example 41, further comprising associating each of the plurality of security controls of the control database to a respective one of the plurality of templates, wherein, for each of the one or more of the plurality of security controls, the matching to the one or more steps of the attack path is responsive to the template associated with the respective security control.

Example 43. The method of any example herein, particularly example 42, wherein, for each of the one or more of the plurality of security controls, the associating to the respective template comprises a respective linguistic comparison of a textual description of the respective security control to the plurality of templates.

Example 44. The method of any example herein, particularly example 42 or 43, wherein, for each of the one or more steps of the attack path, the method further comprises associating the respective step to a respective one of the plurality of templates, wherein, for each of the one or more steps of the attack path, the matched security control is associated with the respective template associated with the respective step.

Example 45. The method of any example herein, particularly example 44, wherein, for each of the one or more steps of the attack path, the associating to the respective template comprises a respective linguistic comparison of a textual description of the respective attack step to the plurality of templates.

Example 46. The method of any example herein, particularly example 45, wherein the linguistic analysis of the textual description of each of the plurality of attack steps comprises a normalization step wherein one or more words of the textual description are normalized to a respective predetermined format, based at least in part on a respective predetermined list of terms.

Example 47. The method of any example herein, particularly any one of examples 1-46, wherein the method further comprises, for each of the plurality of threats: mapping the one or more steps of the attack path to a respective software implementation; and outputting information regarding the software implementation mapping of the one or more steps.

Example 48. The method of any example herein, particularly any one of examples 1-47, wherein the method further comprises, for each of the plurality of threats: mapping the one or more steps of the attack path to a respective hardware implementation; and outputting information regarding the hardware implementation mapping of the one or more steps.

Example 49. The method of any example herein, particularly any one of examples 1-48, wherein the at least the subset of the matched security controls is selected such that they meet a predetermined security depth value.

Example 50. The method of any example herein, particularly example 49, wherein the method further comprises receiving a respective user input indicating a desired security depth, the predetermined security depth value set in accordance with the respective user input.

Example 51. A security control system, comprising one or more processors, and a memory, wherein the memory has stored therein a plurality of instructions, that when run by the one or more processors cause the one or more processors to perform the method of any one of examples 1-50.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A computerized method for selecting security controls against cyber-security attacks, the method comprising:
    receiving risk analysis information comprising data regarding a plurality of threats, each of the plurality of threats associated with a respective asset; and
    loading a control database comprising data regarding a plurality of security controls;
    loading an attack path database comprising data regarding a plurality of attack paths, each of the attack paths comprising a respective plurality of attack steps;
    for each of the plurality of threats, identifying a stored mapping of a feature of the respective threat to one or more attack paths in the attack path database;
    for each of the plurality of threats, matching one or more of the plurality of security controls to each of a plurality steps of the one or more attack paths mapped to the feature of the respective threat;
    for each of the plurality of threats, selecting at least a subset of the matched security controls;
    for each of the plurality of threats, outputting information regarding the selected security controls;
    receiving an initial risk level, the initial risk level defined in accordance with the attack paths of the plurality of threats;
    receiving a target risk level;
    identifying one or more of the attack steps of the plurality of threats that the treatment thereof will achieve the target risk level;
    receiving a user input indicating that a respective one of the security controls was implemented;
    identifying one or more respective attack paths associated with the implemented security control;
    responsive to the identified one or more respective attack paths associated with the implemented security control, defining a residual risk level; and
    outputting the residual risk level,
    wherein the identification of the one or more attack paths that the treatment thereof will achieve the target risk level comprises identifying an attack path that comprises:
        at least one step associated with a first resource, wherein treating the at least one step associated with the first resource mitigates or remediates the identified attack path; and
        at least one step associated with a second resource, wherein treating the at least one step associated with the second resource mitigates or remediates the identified attack path, and
        wherein the second resource is different than the first resource.

2. The method of claim 1, wherein each attack step of each of the plurality of attack paths is an action that an attacker has to perform as part of an attack.

3. The method of claim 1, wherein the output information is based at least in part on:
    expenditure data associated with the respective security controls, the expenditure data indicating a cost and/or effort required to implement the respective security control; and/or
    feasibility data associated with the respective security controls, the feasibility data indicating a degree to which the respective security control will reduce a feasibility rating of a respective one of the plurality of attack steps when implemented.

4. The method of claim 3, wherein the selection of the at least a subset of the matched security controls comprises selecting a subset of the matched security controls based at least in part on the respective expenditure data and/or the respective feasibility data, and
    wherein the output information comprises information regarding the selected subset of security controls.

5. The method of claim 1, wherein the matching comprises matching more than one of the plurality of security controls to more than one attack step in each of the one or more attack paths.

6. The method of claim 1, wherein, each of the one or more attack paths comprises a portion of a respective attack tree.

7. The method of claim 1, wherein the method further comprises:
    loading an implementation database comprising a plurality of security control implementations, each of the plurality of security controls associated with one or more of the plurality of security control implementations; and
    for each of the plurality of threats, selecting at least a subset of the security control implementations associated with the matched security controls,
    wherein the output information comprises information regarding the selected security control implementations, wherein the method further comprises:
for each of the security control implementations associated with the security controls matched to the steps of the identified attack paths, determining a respective coverage value, and
wherein the output information is further based on the determined coverage values of the selected security control implementations.

8. The method of claim 1, further comprising:
for each of the plurality of threats, determining whether the target risk level can be reached; and
outputting a list of the plurality of threats that it is determined that the respective target risk level cannot be reached.

9. The method of claim 1, wherein the feature comprises a description regarding the respective threat, the mapping being based at least in part on a previous match of the respective attack path to a similar description.

10. The method of claim 1, wherein, for each of the plurality of assets, the method further comprises matching a profile of the respective asset contained within the respective risk analysis information and a threat list contained within the respective risk analysis information associated with the respective asset to a respective one of the plurality of attack paths based at least in part on a previous match of the respective attack path to an asset profile and threat list at least partially identical to the profile and threat list of the respective asset.

11. The method of claim 1, further comprising loading a template database comprising data regarding a plurality of templates, each template comprising information regarding an associated resource and information regarding one or more attack steps associated with the respective resource,
wherein the matching the one or more of the plurality of security controls to the one or more steps of the attack path is based at least in part on the data regarding the plurality of templates,
wherein the method further comprises associating each of the plurality of security controls of the control database to a respective one of the plurality of templates, and
wherein, for each of the one or more of the plurality of security controls, the matching to the one or more steps of the attack path is responsive to the template associated with the respective security control.

12. The method of claim 1, wherein the at least the subset of the matched security controls is selected such that they meet a predetermined security depth value.

13. The method of claim 12, further comprising receiving a respective user input indicating a desired security depth, the predetermined security depth value set in accordance with the respective user input.

14. A computerized system for selecting security controls against cyber-security attacks, comprising one or more processors, and a memory, wherein the memory has stored therein a plurality of instructions, that when run by the one or more processors cause the one or more processors to perform one or more steps, the one or more steps comprising:

receiving risk analysis information comprising data regarding a plurality of threats, each of the plurality of threats associated with a respective asset; and
loading a control database comprising data regarding a plurality of security controls;
loading an attack path database comprising data regarding a plurality of attack paths, each of the attack paths comprising a respective plurality of attack steps;
for each of the plurality of threats, identifying a stored mapping of a feature of the respective threat to one or more attack paths in the attack path database;
for each of the plurality of threats, matching one or more of the plurality of security controls to each of a plurality of steps of the one or more attack paths mapped to the feature of the respective threat;
for each of the plurality of threats, selecting at least a subset of the matched security controls;
for each of the plurality of threats, outputting information regarding the selected security controls;
receiving an initial risk level, the initial risk level defined in accordance with the attack paths of the plurality of threats;
receiving a target risk level;
identifying one or more of the attack steps of the plurality of threats that the treatment thereof will achieve the target risk level;
receiving a user input indicating that a respective one of the security controls was implemented;
identifying one or more respective attack paths associated with the implemented security control;
responsive to the identified one or more respective attack paths associated with the implemented security control, defining a residual risk level; and
outputting the residual risk level,
wherein the identification of the one or more attack paths that the treatment thereof will achieve the target risk level comprises identifying an attack path that comprises:
at least one step associated with a first resource, wherein treating the at least one step associated with the first resource mitigates or remediates the identified attack path; and
at least one step associated with a second resource, wherein treating the at least one step associated with the second resource mitigates or remediates the identified attack path, and
wherein the second resource is different than the first resource.

15. The system of claim 14, wherein each attack step of each of the plurality of attack paths is an action that an attacker has to perform as part of an attack.

16. The system of claim 14, wherein the feature comprises a description regarding the respective threat, the mapping being based at least in part on a previous match of the respective attack path to a similar description.

* * * * *